(12) United States Patent
Ino et al.

(10) Patent No.: US 11,256,071 B2
(45) Date of Patent: Feb. 22, 2022

(54) LENS APPARATUS AND IMAGING SYSTEM INCLUDING THE SAME

(71) Applicant: CANON KABUSHIKI KAISHA, Tokyo (JP)

(72) Inventors: Tomohiro Ino, Utsunomiya (JP); Masato Katayose, Utsunomiya (JP); Toru Matsumoto, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 347 days.

(21) Appl. No.: 16/555,984

(22) Filed: Aug. 29, 2019

(65) Prior Publication Data
US 2020/0073095 A1 Mar. 5, 2020

(30) Foreign Application Priority Data

Sep. 4, 2018 (JP) .............................. JP2018-165389

(51) Int. Cl.
*G02B 15/14* (2006.01)
*G02B 26/12* (2006.01)
*G02B 3/00* (2006.01)
*G02B 7/10* (2021.01)
*G03B 17/02* (2021.01)

(52) U.S. Cl.
CPC ....... *G02B 15/1421* (2019.08); *G02B 3/0075* (2013.01); *G02B 7/10* (2013.01); *G02B 26/128* (2013.01); *G03B 17/02* (2013.01)

(58) Field of Classification Search
CPC ............. G02B 15/1421; G02B 26/128; G02B 3/0075; G02B 7/09; G02B 7/10; G02B 7/28; G02B 9/06; G03B 17/02; G03B 17/14; G03B 3/10
See application file for complete search history.

(56) References Cited

U.S. PATENT DOCUMENTS

| 6,195,314 | B1 | 2/2001 | Inui |
| 6,631,042 | B2 | 10/2003 | Noguchi |
| 7,291,942 | B2 | 11/2007 | Osaka |
| 7,457,061 | B2 | 11/2008 | Sata |

(Continued)

FOREIGN PATENT DOCUMENTS

| CN | 101515059 A | 8/2009 |
| CN | 104469186 A | 3/2015 |

(Continued)

*Primary Examiner* — Joseph P Martinez
*Assistant Examiner* — Vipin Patel
(74) *Attorney, Agent, or Firm* — Canon U.S.A., Inc. IP Division

(57) ABSTRACT

A lens apparatus includes an imaging optical system includes an imaging optical system including a plurality of lenses, a first holding member holding at least a first lens closest to an object among the plurality of lenses, and configured to move in an optical axis direction of the imaging optical system to perform focusing, a barrel member provided on an outside of the first holding member, and a control unit configured to control a driving unit configured to move the first holding member. When focus is at infinity, an edge surface on an object side of the barrel member is positioned on the object side of a surface vertex of an object-side surface of the first lens. When focus is at infinity, an edge surface on the object side of the control unit is positioned on the object side of the surface vertex.

13 Claims, 20 Drawing Sheets

(56) References Cited

U.S. PATENT DOCUMENTS

| | | |
|---|---|---|
| 8,224,169 B2 | 7/2012 | Tsuruta |
| 10,423,006 B2 | 9/2019 | Taguchi |
| 10,712,177 B2 | 7/2020 | Umehara |
| 2006/0034599 A1 | 2/2006 | Osaka |
| 2011/0097062 A1 | 4/2011 | Tsuruta |
| 2011/0109788 A1* | 5/2011 | Santo .................... G02B 7/023 348/345 |
| 2011/0158616 A1 | 6/2011 | Chiang |
| 2016/0014339 A1 | 1/2016 | Miller |
| 2016/0109721 A1 | 4/2016 | Min |
| 2017/0343886 A1 | 11/2017 | Park |
| 2018/0164603 A1 | 6/2018 | Taguchi |
| 2018/0213131 A1 | 7/2018 | Liu |
| 2019/0107684 A1 | 4/2019 | Osaka |
| 2019/0115818 A1 | 4/2019 | Yu |

FOREIGN PATENT DOCUMENTS

| | | |
|---|---|---|
| CN | 106662755 A | 5/2017 |
| CN | 108292022 A | 7/2018 |
| EP | 3217202 A1 | 9/2017 |
| EP | 3522517 A1 | 8/2019 |
| JP | 2003-322787 A | 11/2003 |
| JP | 2006-171346 A | 6/2006 |
| JP | 201357872 A | 3/2013 |
| JP | 2013-218015 A | 10/2013 |
| JP | 2014-016572 A | 1/2014 |
| JP | 2015169883 A | 9/2015 |
| JP | 2016224143 A | 12/2016 |
| JP | 2018136570 A | 8/2018 |
| KR | 20180082384 A | 7/2018 |
| WO | 2009/133691 A1 | 11/2009 |
| WO | 2014/178260 A1 | 11/2014 |

* cited by examiner

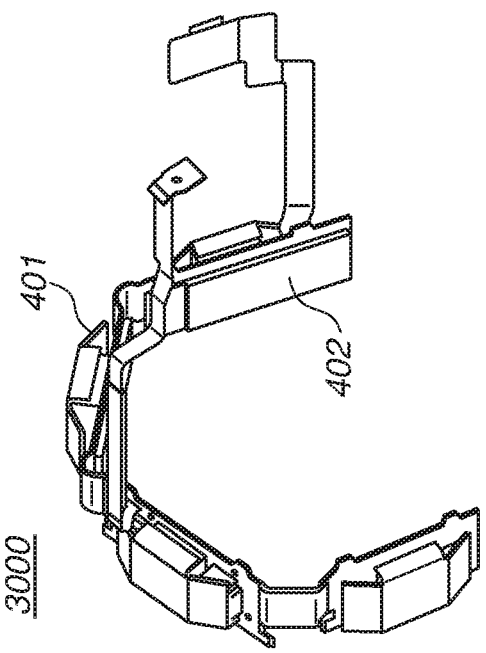
FIG.10A
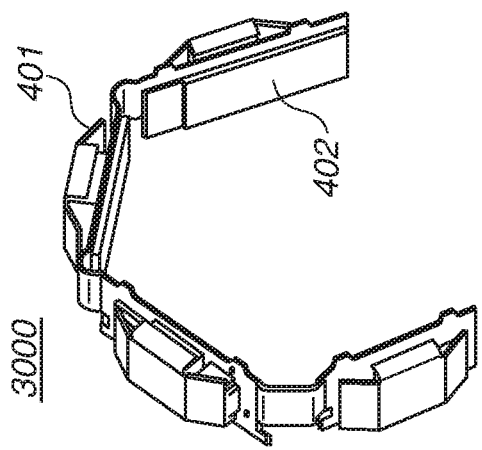
FIG.10B
FIG.10C
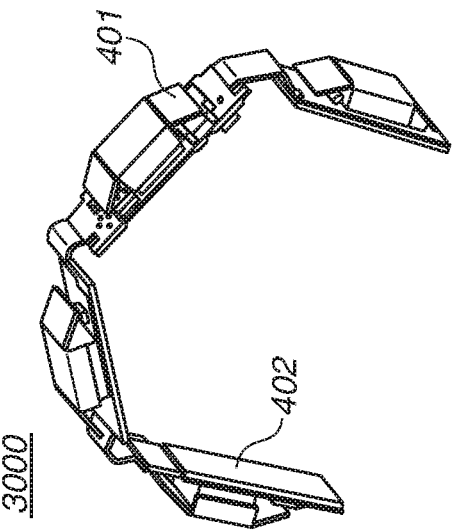
FIG.10D

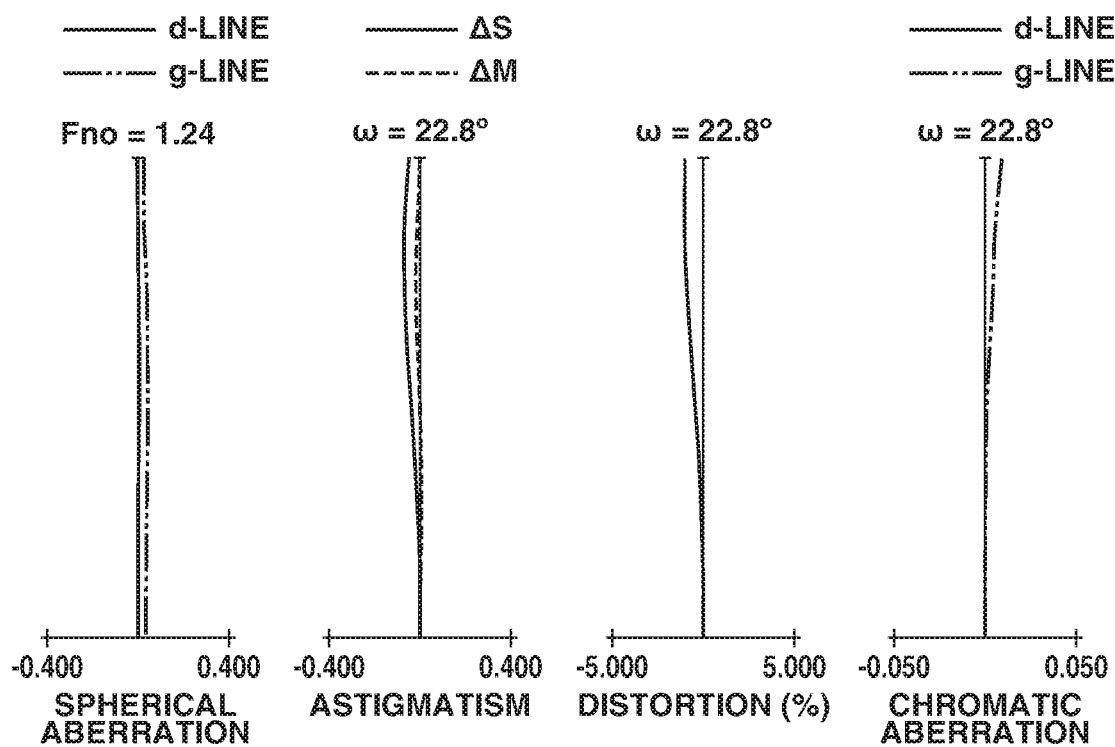
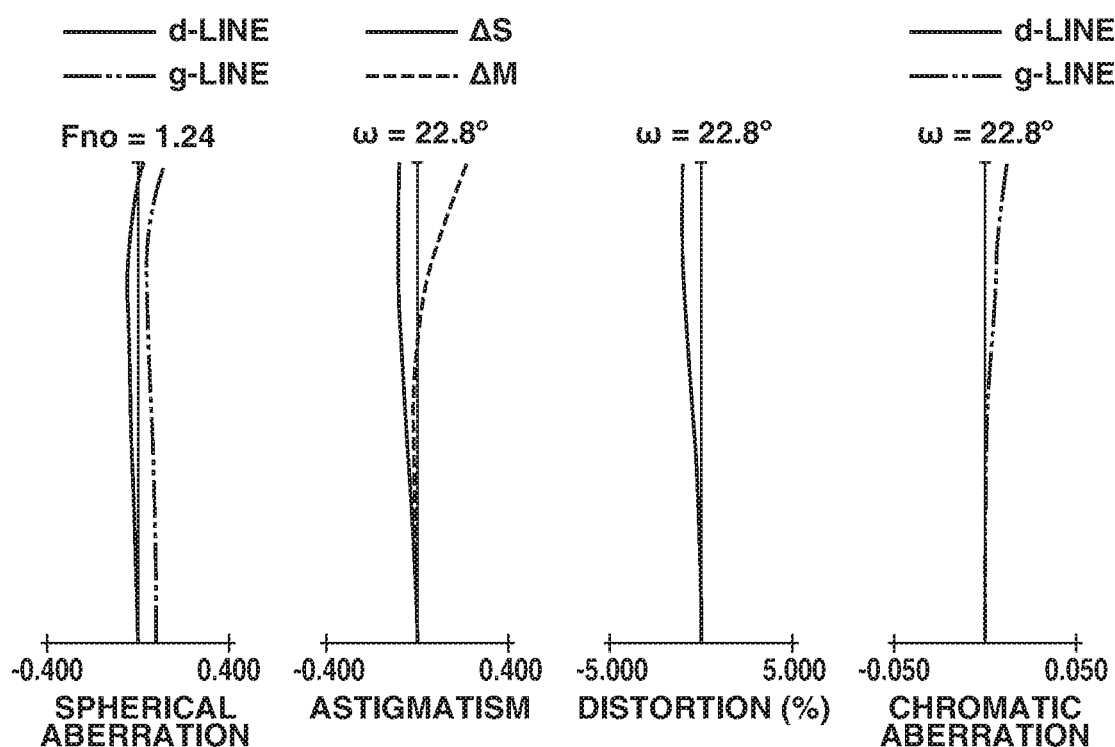

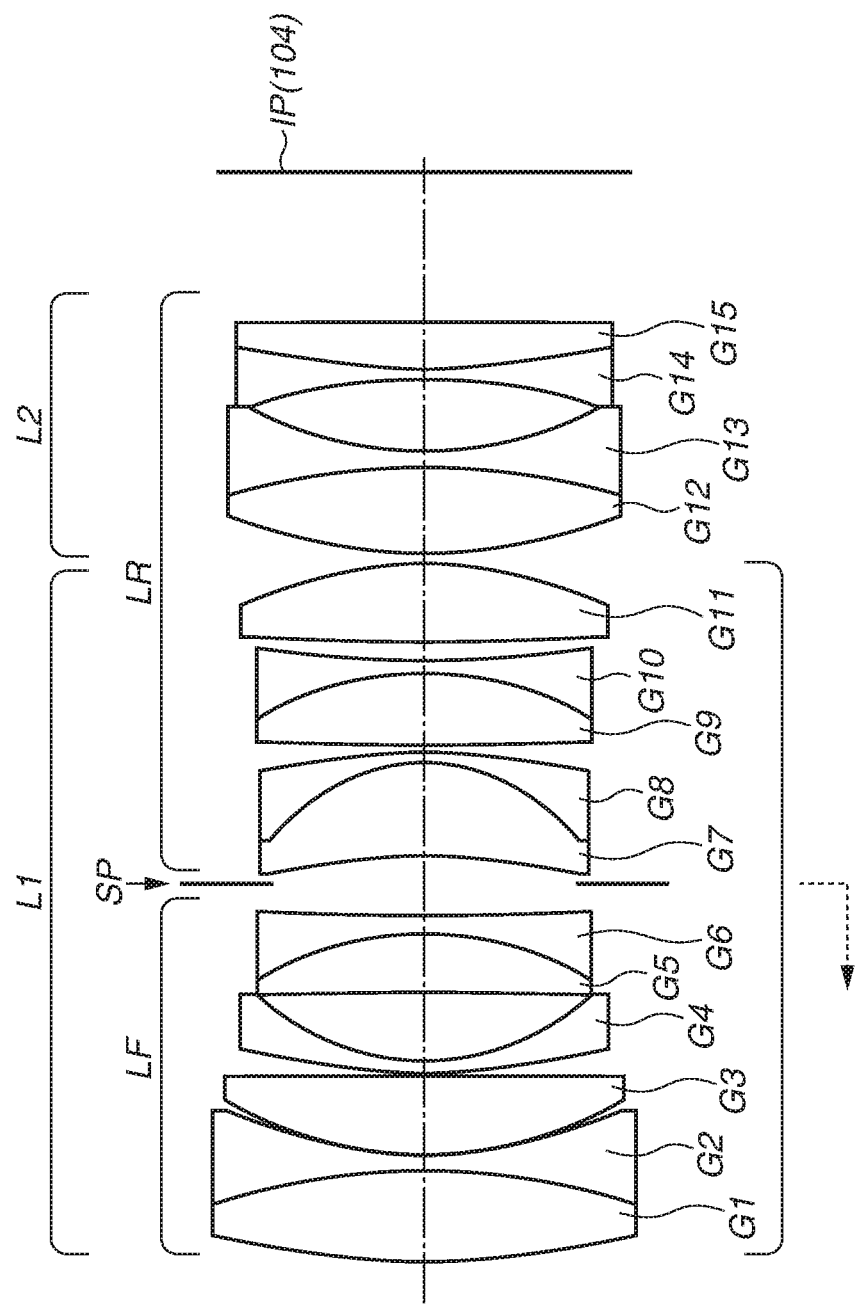

LENS APPARATUS AND IMAGING SYSTEM INCLUDING THE SAME

BACKGROUND OF THE INVENTION

Field of the Invention

The present invention relates to a lens apparatus and an imaging system including the same.

Description of the Related Art

The lens apparatus described in Japanese Patent Application Laid-Open No. 2013-218015 is known as an interchangeable lens (lens apparatus) that performs focusing by a plurality of lenses moving in an optical axis direction. The plurality of lenses includes a lens provided closest to an object, (object side, enlargement conjugate side). The interchangeable lens discussed in Japanese Patent Application Laid-Open No. 2013-218015 includes, in order from the object side, a first lens unit having positive refractive power and a second lens unit having positive or negative refractive power, and the first lens unit moves in the optical axis direction in focusing. In addition, the first lens unit includes, in order from the object side, a first lens subunit having positive refractive power, a stop, and a second lens subunit having positive refractive power.

Impactive force in the optical axis direction is assumed to be added from the object side to the interchangeable lens discussed in Japanese Patent Application Laid-Open No. 2013-218015. In this case, if a front-lens-holding frame for holding the lens provided closest to the object protrudes toward the object farther than an outer barrel member provided on the outside of the front-lens-holding frame, the impactive force directly acts on the front lens holding frame, which is undesirable. If the impactive force directly acts on the front-lens-holding frame, the shape and the position of the lens provided inside the front-lens-holding frame may change. Thus, at least when focus is at infinity, the outer barrel member desirably protrudes toward the object farther than the front-lens-holding frame.

In addition, if a lens provided closest to an object moves in an optical axis direction as in the interchangeable lens discussed in Japanese Patent Application Laid-Open No. 2013-218015, a lens provided closest to the object when focus is at a close distance is positioned closest to the object within a movable range of the lens. In addition, a lens provided closest to the object when focus is at infinity is positioned closest to an image side within a movable range of the lens.

There has been widely known an interchangeable lens having a configuration including an actuator such as an ultrasonic motor (USM) for moving a lens in an optical axis direction in focusing, and a control board for controlling the actuator, which is not clearly discussed in Japanese Patent Application Laid-Open No. 2013-218015. When the interchangeable lens having such a configuration is attached to a camera main body including an image sensor, if the control board and the image sensor are brought too close to each other, magnetic noise produced by the control board may reach the image sensor and the image quality of a captured image may be degraded.

Japanese Patent Application Laid-Open No. 2013-218015 does not discuss a configuration of an interchangeable lens that can reduce the above-described influence of the impactive force exerted in the optical axis direction and the above-described influence of magnetic noise.

SUMMARY OF THE INVENTION

In view of the foregoing, the present invention is directed to a lens apparatus that can reduce influence of impactive force exerted in an optical axis direction and influence of magnetic noise, and an imaging system including the lens apparatus.

According to an aspect of the present invention, a lens apparatus includes an imaging optical system including a plurality of lenses, a first holding member holding at least a first lens closest to an object among the plurality of lenses, and configured to move in an optical axis direction of the imaging optical system to perform focusing, a barrel member provided on an outside of the first holding member, and a control unit configured to control a driving unit configured to move the first holding member. When focus is at infinity, an edge surface on an object side of the barrel member is positioned on the object side of a surface vertex of an object-side surface of the first lens. When focus is at infinity, an edge surface on the object side of the control unit is positioned on the object side of the surface vertex.

Further features of the present invention will become apparent from the following description of exemplary embodiments with reference to the attached drawings.

BRIEF DESCRIPTION OF THE DRAWINGS

FIGS. 10A to 10D are perspective views each illustrating a circuit substrate according to the second exemplary embodiment.

FIGS. 12A and 12B are aberration diagrams respectively illustrating a state in which focus is at infinity, and a state in which focus is at a close distance, according to Numerical Example 1.

FIG. 15 is a lens cross-sectional view according to Numerical Example 3.

DESCRIPTION OF THE EMBODIMENTS

A first exemplary embodiment of the present invention will be described below. Configurations of a lens apparatus 200 according to the present exemplary embodiment and a camera main body (an imaging apparatus) 100 to which the lens apparatus 200 is attachable will be described with reference to FIGS. 1 to 8. The lens apparatus 200 and the camera main body 100 will be collectively referred to as a camera system (an imaging system).
(Configuration of Camera Main Body)

Figure 1:
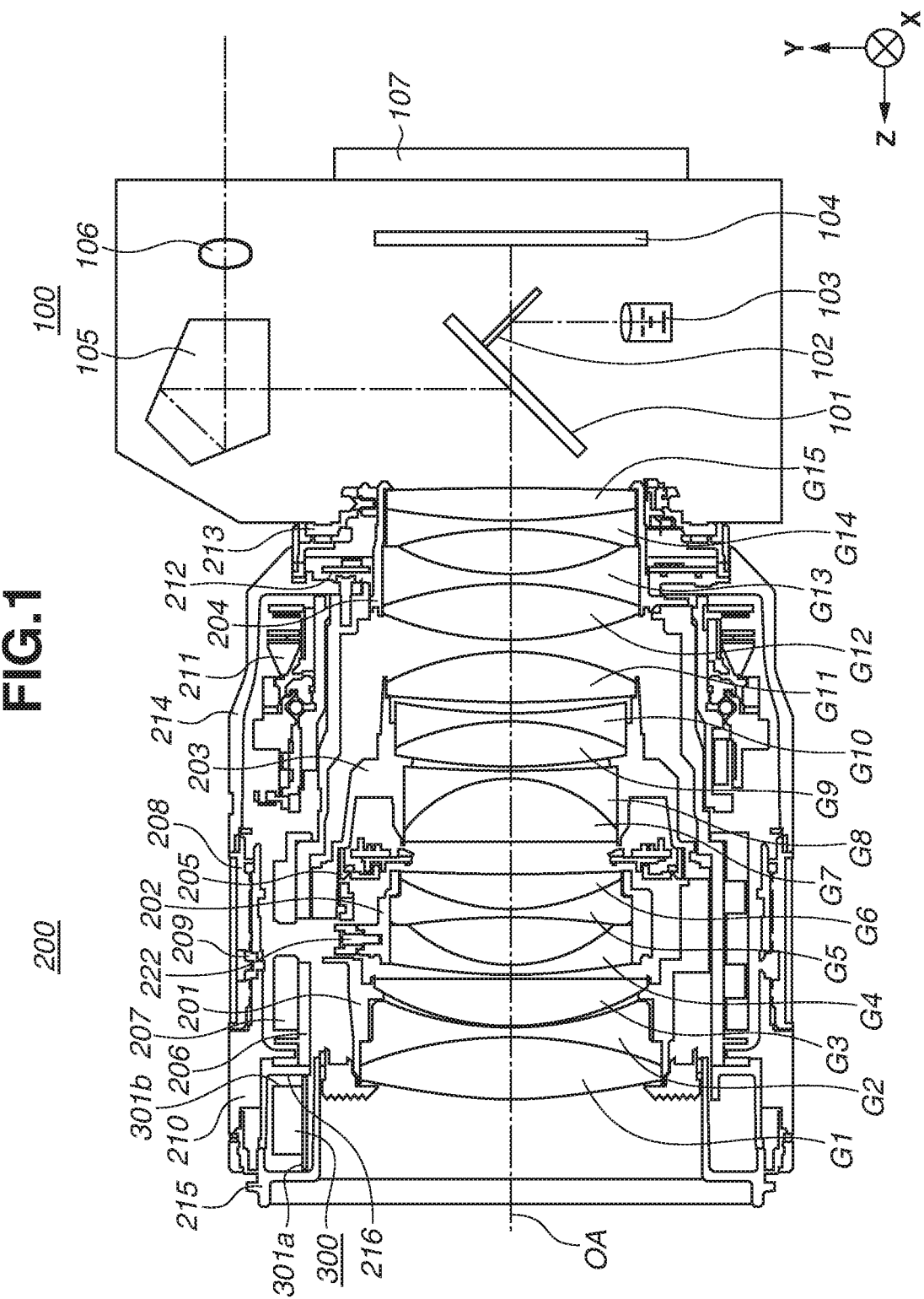
FIG. 1 is a schematic diagram illustrating a lens barrel and a camera in an infinity focusing state according to a first exemplary embodiment.
Figure 2:
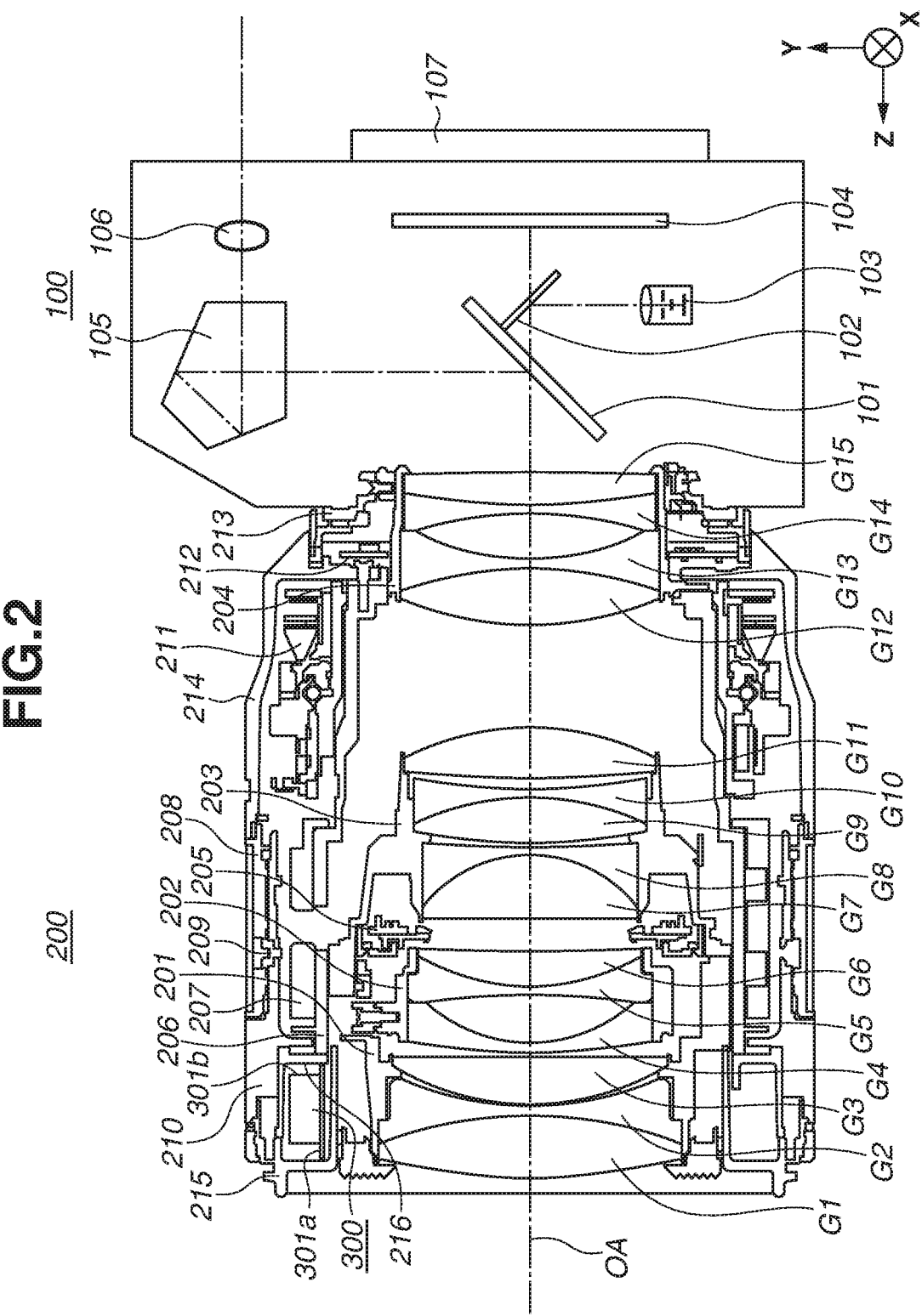
FIG. 2 is a schematic diagram illustrating the lens barrel and the camera in a close-distance focusing state according to the first exemplary embodiment.

First of all, the configuration of the camera main body 100 will be described with reference to FIGS. 1 and 2. FIG. 1 is a schematic diagram illustrating a state in which an imaging distance of the lens apparatus 200 is at infinity (infinity focusing state). FIG. 2 is a schematic diagram illustrating a state in which an imaging distance of the lens apparatus 200 is at a close distance. In other words, FIG. 1 is a schematic diagram of the lens apparatus 200 illustrating a state in which focus is at infinity. FIG. 2 is a schematic diagram of the lens apparatus 200 illustrating a state in which focus is at a close distance.

In FIGS. 1 and 2, the lens apparatus 200 is attachable to and detachable from the camera main body (hereinafter, simply referred to as a "camera") 100. In other words, the lens apparatus 200 is an interchangeable lens.

A main mirror 101 is disposed on an optical path of light fluxes from the lens apparatus 200. The main mirror 101 reflects a part of the light fluxes and guides the light fluxes to a finder optical system (105, 106), and lets through remaining light fluxes. A sub mirror 102 is disposed behind the main mirror 101 (on an image side). The sub mirror 102 reflects the light fluxes transmitted through the main mirror 101 and guides the light fluxes to a focus detection unit 103. In addition, the main mirror 101 and the sub mirror 102 can be integrally inserted into or removed from the above-described optical path by a driving mechanism (not illustrated).

The focus detection unit 103 performs focus detection (detection of a focus state of the lens apparatus 200) using a phase difference detection method. An image sensor 104 serves as an imaging unit and includes a charge-coupled device (CCD) sensor or a complementary metal-oxide semiconductor (CMOS) sensor. On the light receiving surface (imaging plane) of the image sensor 104, the light fluxes from the main mirror 101 and the lens apparatus 200 form an object image (image). The image sensor 104 photoelectrically converts the formed object image and outputs an imaging signal.

The imaging signal is input from the image sensor 104 to a signal processing unit (not illustrated), and a display panel 107 displays an image output from the signal processing unit and other various types of imaging information.

The camera 100 is a single-lens reflex camera including the main mirror 101, the sub mirror 102, the focus detection unit 103, the image sensor 104, and the finder optical systems 105 and 106. In addition, the camera 100 may be a mirrorless camera not including the main mirror 101, the sub mirror 102, and the like.

In addition, in place of the focus detection unit 103, the image sensor 104 may include pixels for focus detection (pixels for AF) that generate image signals for performing autofocus (AF) using an imaging plane phase difference detection method. The focus detection may be performed using a contrast detection method based on a signal obtained from the image sensor 104.
(Configuration of Lens Apparatus)

Next, the configuration of the lens apparatus 200 will be described with reference to FIGS. 1 and 2. The descriptions of FIGS. 1 and 2 have been given above. In FIGS. 1 and 2, a direction of an optical axis OA of an imaging optical system (hereinafter, referred to as an "optical axis OA") is regarded as a Z direction. Out of two directions that are orthogonal to the optical axis OA and parallel to an imaging plane of the image sensor 104, a transverse direction is regarded as an X direction and a longitudinal direction is regarded as a Y direction.

The lens apparatus 200 can perform a focusing operation (focusing) by moving a movable lens unit in an optical axis direction with a relative movement of a guide barrel 206 and a cam barrel 207 (described below). The movable lens unit is a focus lens unit configured to move in a focusing operation so as to change an interval provided between the focus lens unit and an adjacent lens unit.

A first lens G1, a second lens G2, and a third lens G3 are held by a first lens holding frame (first holding member, first lens holding member) 201. As will be described below, the first lens holding frame 201 moves in focusing. In addition, the first lens holding frame 201 holds the first lens G1 which is a lens provided closest to an object among a plurality of lenses included in the imaging optical system. In other words, the first lens holding frame 201 moves in the optical axis direction of the imaging optical system to focus, together with the first lens G1.

A fourth lens G4, a fifth lens G5, and a sixth lens G6 are held by a second lens holding frame (second holding member, second lens holding member) 202. The first lens holding frame 201 and the second lens holding frame 202 are fixed to each other by a screw. A seventh lens G7, an eighth lens G8, a ninth lens G9, a tenth lens G10, and an eleventh lens G11 are held by a third lens holding frame (third holding member, third lens holding member) 203. The second lens holding frame 202 is held by a cam follower 222 so as to be position-adjustable with respect to the third lens holding frame 203 in a manufacturing process. After the position adjustment in the manufacturing process is completed, the position of the second lens holding frame 202 with respect to the third lens holding frame 203 becomes unchangeable. A twelfth lens G12, a thirteenth lens G13, a fourteenth lens G14, and a fifteenth lens G15 are held by a fourth lens holding frame (fourth lens holding member) 204. The fourth lens holding frame 204 is fixed to the guide barrel 206 by a screw.

A stop unit 205 is disposed on an object side (object surface side) of the seventh lens G7, and adjusts a light amount of a light flux from a subject to the camera 100 side. The stop unit 205 and a communication substrate 212 are connected by a flexible printed circuit board (not illustrated).

The guide barrel 206 includes three straight grooves for guiding the first to third lens holding frames 201, 202, and 203 in the optical axis direction. The straight grooves are provided at equal intervals in a direction extending around the optical axis (hereinafter, referred to as a circumferential direction).

The cam barrel 207 is provided on the outer circumference of the guide barrel 206. The cam barrel 207 includes three cam groove portions (not illustrated) that drive the first to third lens holding frames 201, 202, and 203 in the optical axis OA direction. The cam groove portions are provided at equal intervals in the circumferential direction.

When the cam barrel 207 rotates in the circumferential direction, the third lens holding frame 203 is moved forward or backward in the optical axis OA direction by a cam follower (not illustrated) provided on the third lens holding frame 203 engaged with the cam groove provided on the cam barrel 207 and the straight groove provided on the guide barrel 206. The position of the second lens holding frame 202 with respect to the third lens holding frame 203 is fixed. In addition, the first lens holding frame 201 and the second lens holding frame 202 are fixed to each other by a screw. Thus, when the cam barrel 207 rotates, the first lens holding frame 201, the second lens holding frame 202, and the third lens holding frame 203 move forward or backward in the optical axis OA direction.

A focus operation ring 208 is a so-called electron ring. The focus operation ring 208 is held by a holding member 209 so as to be immovable in the optical axis OA and rotatable around the optical axis OA.

The holding member 209 is held by being pressed into a hole portion provided on a focus fixing barrel 210. In the present exemplary embodiment, a focus motor unit 211 is an ultrasonic motor that rotates using deformation appearing when voltage is applied to a piezoceramic. An output key 221 (illustrated in FIG. 7) of the focus motor unit 211 is engaged with the cam barrel 207. When rotative force is exerted on the cam barrel 207 by the focus motor unit 211, as described above, the first to third lens holding frames 201, 202, and 203 move forward or backward in the optical axis OA direction and focusing is performed. The lens holding frame other than the first to third lens holding frames 201, 202, and 203 does not move forward or backward in the optical axis OA direction in focusing.

When the focus operation ring 208 is rotated, a rotation amount of the focus operation ring 208 is detected by a photointerrupter (not illustrated), and the focus motor unit (driving unit) 211 is driven based on the detected value. In other words, the focus motor unit 211 is a driving unit for moving the first lens holding frame 201 in the optical axis direction for focusing. A known method is used as a detection method of a rotation amount, and thus a description thereof will be omitted.

The lens apparatus 200 is attachable to and detachable from the camera 100 via a mount 213.

(Structure of Periphery of Circuit Substrate)

Figure 3:
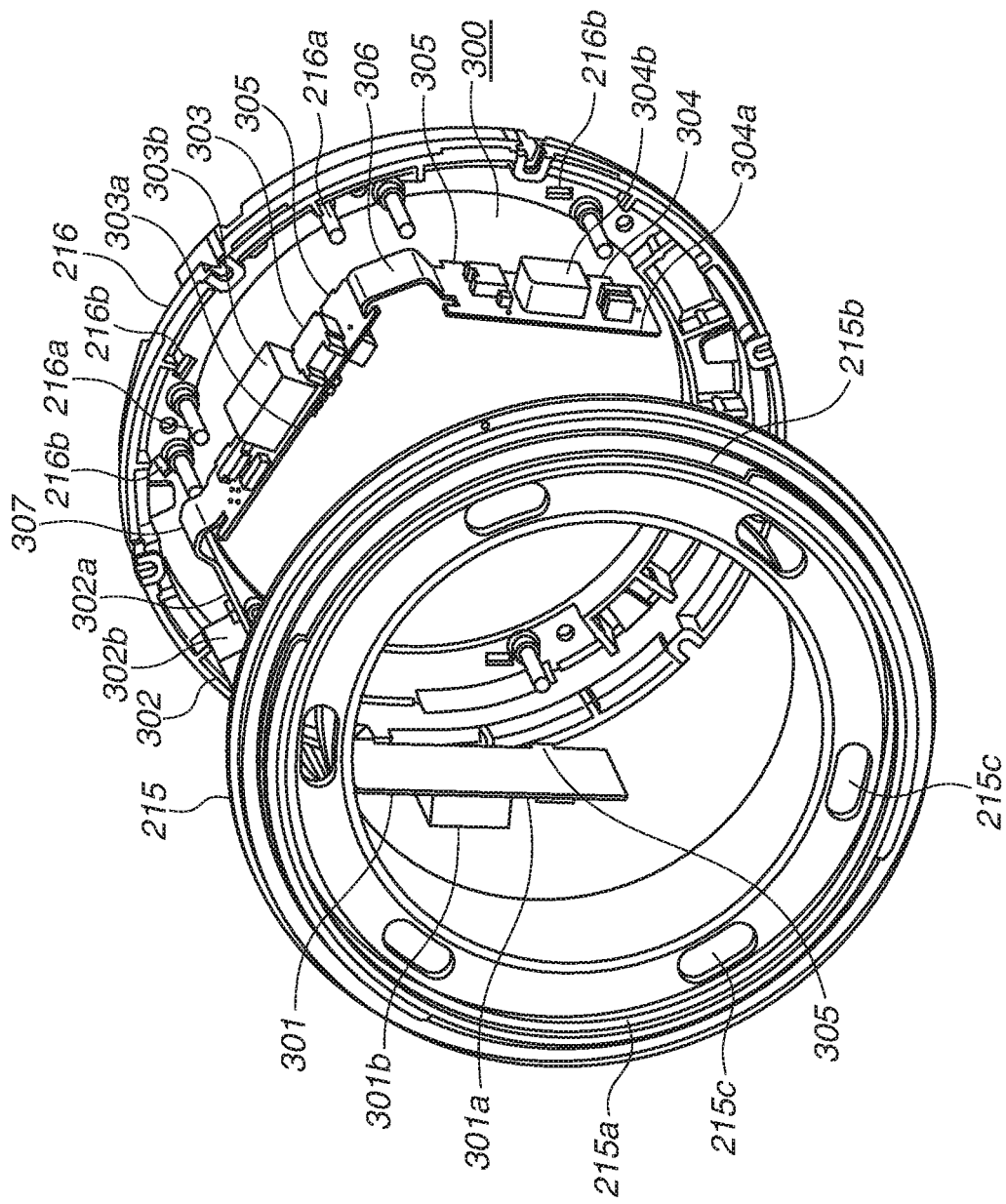
FIG. 3 is an exploded perspective view illustrating a structure of a periphery of a circuit substrate according to the first exemplary embodiment.
Figure 4:
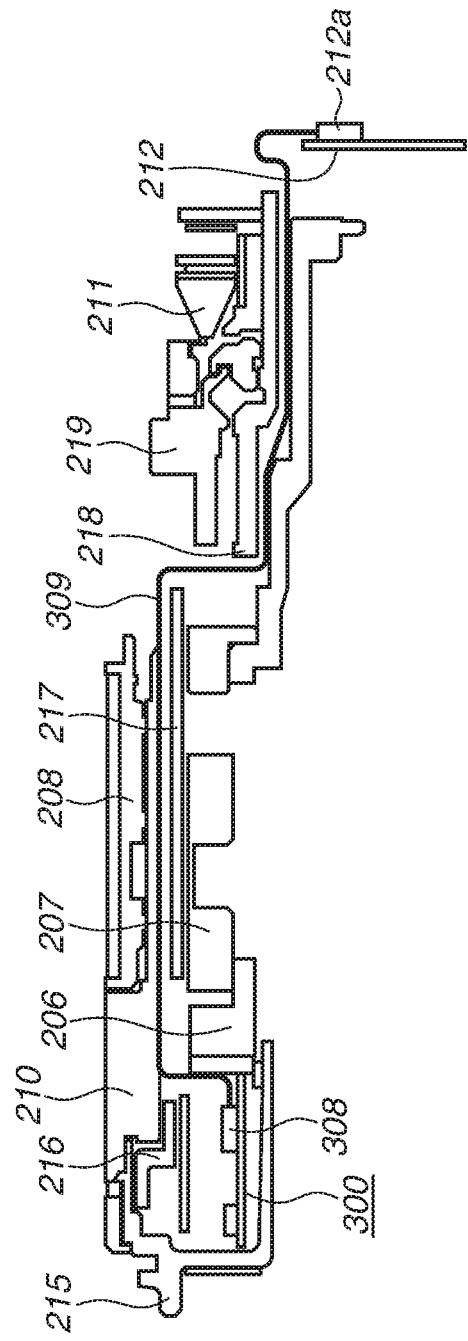
FIG. 4 is a partial cross-sectional view illustrating a connection relationship between the circuit substrate and a communication substrate according to the first exemplary embodiment.
Figure 5:
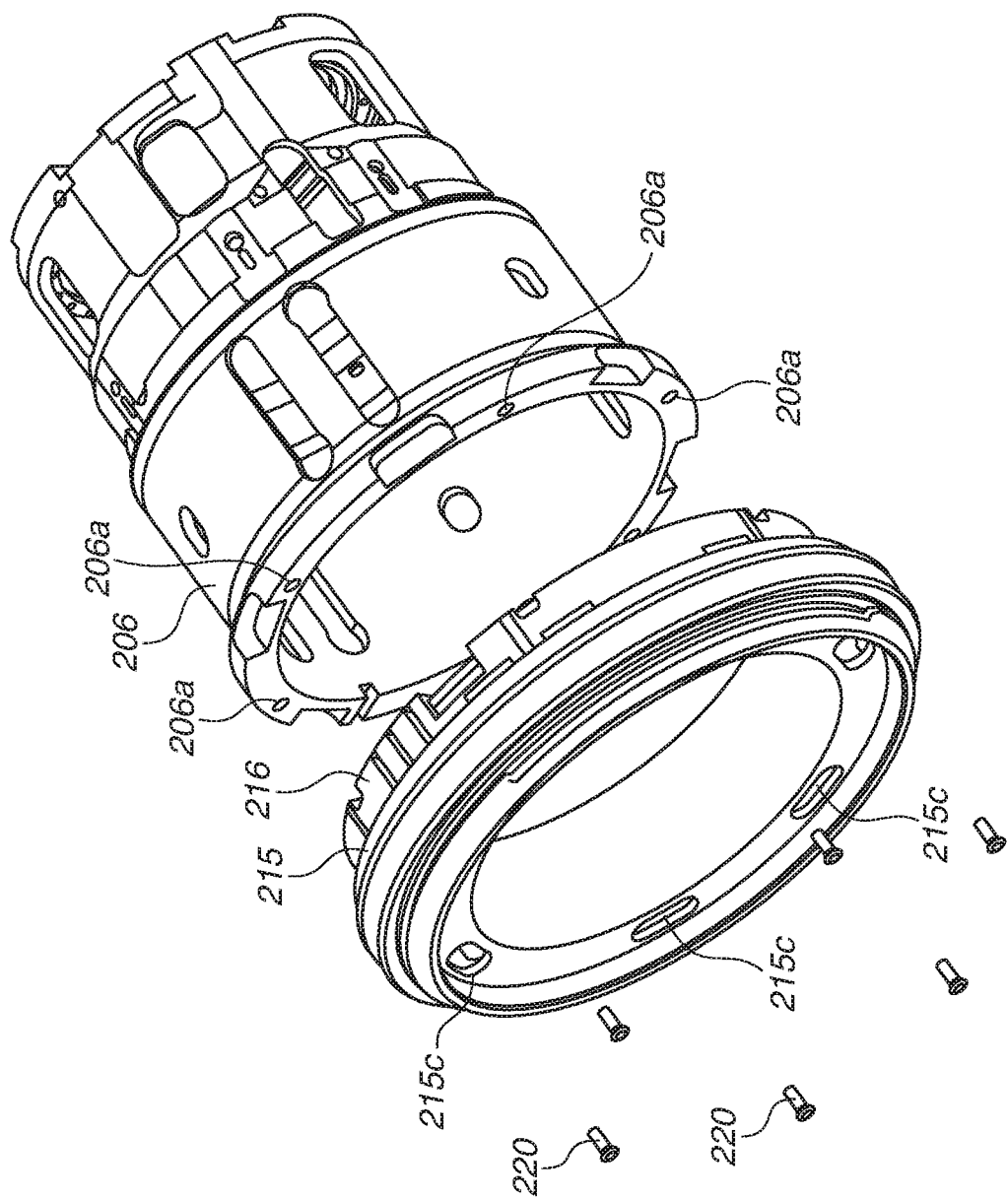
FIG. 5 is an exploded perspective view illustrating a filter frame portion according to the first exemplary embodiment.

Next, a circuit substrate (driving substrate) 300 will be described with reference to FIGS. 3 to 5. FIG. 3 is an exploded perspective view illustrating a structure of the periphery of the circuit substrate 300 according to the present exemplary embodiment. FIG. 4 is a partial cross-sectional view illustrating a connection relationship between the circuit substrate 300 and a communication substrate. FIG. 5 is an exploded perspective view illustrating a structure of the periphery of a filter frame portion.

The circuit substrate 300 is formed by a rigid substrate. Electric elements for driving the focus motor unit 211 are mounted on the circuit substrate 300. The electric elements include driving coils 301b, 302b, 303b, and 304b. The circuit substrate 300 includes four individual electric element mounting portions (mounting portions) 301, 302, 303, and 304 on which the electric elements are mounted. As illustrated in FIG. 3, the four mounting portions are connected with each other by a flexible cable portion.

The circuit substrate 300 is connected with the communication substrate 212 by a communication cable 309 so that communication can be performed with each other. As illustrated in FIG. 4, the communication cable 309 is connected to a circuit substrate connector 308 and a communication substrate connector 212a. A method of connecting the circuit substrate 300 and the communication substrate 212 will be described in detail below. When a drive command is output from the communication substrate 212, the circuit substrate 300 drives the focus motor unit 211 based on a value of the drive command. In other words, the circuit substrate 300 serves as a control unit for controlling the focus motor unit 211 serving as a driving unit. The communication substrate 212 serves as a communication unit for communicating with the camera 100.

A filter frame 215 serves as a barrel member. The filter frame 215 is provided with a filter screw portion 215a so that an optical filter can be attached thereto. In addition, the filter frame 215 is provided with a bayonet groove portion 215b for attaching a hood. The filter frame 215 is provided on the outside of the first lens holding frame 201.

A substrate holding frame 216 is provided with a plurality of pins 216a for holding the circuit substrate 300. In addition, engagement between a hole portion 216b of the substrate holding frame 216 and a protruding portion 305 provided on the circuit substrate 300 regulates the movement in the circumferential direction of the circuit substrate 300.

By the substrate holding frame 216 and the filter frame 215 being fastened in a state in which the circuit substrate 300 is sandwiched by the substrate holding frame 216 and the filter frame 215 from the front and the back, the movement in the optical axis OA direction of the circuit substrate 300 is regulated. As illustrated in FIG. 5, in a state in which the circuit substrate 300 is held by the substrate holding frame 216 and the filter frame 215, the circuit substrate 300 is fastened by screws 220 being inserted into screw hole portions 206a of the guide barrel 206 through apertures 215c provided on the filter frame 215.

(Configuration for Reducing Influence of Magnetic Noise)

Magnetic noise reaching the image sensor 104 from the driving coils 301b, 302b, 303b, and 304b included in the circuit substrate 300 will be described. Because the magnitude of magnetic noise is inversely proportional to the cube of a distance in general, as a generation source of magnetic noise gets farther from the image sensor 104, influence on a captured image becomes smaller. A generation source of magnetic noise in the present exemplary embodiment corresponds to the first to fourth driving coils 301b, 302b, 303b, and 304b.

In the present exemplary embodiment, even when a first lens unit moves in focusing as illustrated in FIGS. 1 and 2, the total length of the lens apparatus 200 remains unchanged and a surface vertex on the object side of the first lens G1 is prevented from protruding farther than a leading end portion of the filter frame 215. This makes impactive force difficult to be added directly to a lens. The above-described first lens unit is a group of a plurality of lenses held by the first to third lens holding frames 201, 202, and 203 that move in focusing. More specifically, in the present exemplary embodiment, the first to eleventh lenses G1 to G11 correspond to the first lens unit. In addition, the twelfth to fifteenth lenses G12 to G15 correspond to a second lens unit.

If such a configuration is employed, a space can be secured on the object side of the lens apparatus 200. In other words, in the present exemplary embodiment, the following structure is employed as a countermeasure structure for impactive force: the leading end portion of the filter frame 215 (edge surface on the object side of the filter frame 215) protrudes toward the object farther than a surface vertex on the object side of the first lens G1 when focus is at infinity or when focus is at a close distance. This structure can make impactive force that is to be exerted from the object side onto the lens apparatus 200, difficult to be conveyed to a lens provided inside the lens apparatus 200.

Since the leading end portion of the filter frame 215 protrudes toward the object, if the circuit substrate 300 is provided on the communication substrate 212, a space in which the circuit substrate 300 is provided becomes a dead space in the present exemplary embodiment. Thus, in the present exemplary embodiment, the aforementioned countermeasure structure for impactive force is employed, and the circuit substrate 300 is provided in a dead space generated when the circuit substrate 300 is provided on the communication substrate 212. The dead space can thereby be effectively utilized, and the lens apparatus 200 can thereby be prevented from upsizing in a radial direction even if the circuit substrate 300 is provided at a position different from the communication substrate 212. Furthermore, the dead space is provided closer to the object in the imaging optical system than the communication substrate 212. In other words, the circuit substrate 300 including a magnetic noise generation source can be placed at a position distant from the image sensor 104 in a state in which the lens apparatus 200 is attached to the camera 100, according to the present exemplary embodiment. As a result, it is possible to suppress the influence of magnetic noise while downsizing the lens apparatus 200 according to the present exemplary embodiment.

More specifically, as illustrated in FIGS. 1 and 2, in the lens apparatus 200, an object side edge surface (side surface) 301a of the circuit substrate 300 is disposed on the object side of an object side surface vertex of the first lens G1 at least in the infinity focusing state. The same applies to other object side edge surfaces 302a, 303a, and 304a of the circuit substrate 300. This makes it possible to dispose, at positions distant from the image sensor 104, the first to fourth driving coils 301b to 304b serving as a generation source of magnetic noise, while suppressing an increase in the external diameter of the lens apparatus 200 as described above. It is therefore possible to provide a compact lens apparatus advantageous in reducing magnetic noise reaching an image sensor.

The object side edge surface of the circuit substrate 300 will be described in more detail as follows. As illustrated in FIG. 3, the circuit substrate 300 includes a plurality of electric element mounting portions disposed in the circumferential direction extending around the optical axis direction, and a flexible cable portion that connects between the plurality of electric element mounting portions. The plurality of electric element mounting portions corresponds to the aforementioned electric element mounting portions 301, 302, 303, and 304. In addition, the flexible cable portion corresponds to connection portions 306 and 307 illustrated in FIG. 3, and another connection portion (not illustrated). The connection portion 306 connects between the electric element mounting portions 304 and 303. The connection portion 307 connects between the electric element mounting portions 303 and 302. In addition, the connection portion not illustrated in FIG. 3 connects between the electric element mounting portions 302 and 301.

Each of the electric element mounting portions includes a connected portion directly connected to the corresponding connection portion, and a substrate portion provided on the upside or downside of the connected portion. On the substrate portion, the aforementioned driving coil and other electric elements are provided. The object side edge surface of the circuit substrate 300 may be a side surface on the object side of the connected portion or a side surface on the object side of the substrate portion.

In the present exemplary embodiment, at least one of the plurality of electric element mounting portions includes a plate-like member provided on the downside (underside) of a substrate portion provided on the downside (underside) of a connected portion. A side surface on the object side of the plate-like member may be regarded as the object side edge surface of the circuit substrate 300. The plate-like member has elasticity. An undermentioned second magnetic shield 402 is provided on the downside (underside) of the plate-like member.

In some cases, the plurality of electric element mounting portions includes an electric element mounting portion different in size from the other electric element mounting portions. In this case, a side surface on the object side of any of a connected portion, a substrate portion, and a plate-like member that are included in an electric element mounting portion protruding toward an object the most among the plurality of electric element mounting portions can be regarded as the object side edge surface of the circuit substrate 300.

In the present exemplary embodiment, the object side edge surface 301a of the circuit substrate 300 is disposed at the image side of the surface vertex on the object side of the first lens G1 in a close-distance focusing state (state in which focus is at a close distance). In other words, the circuit substrate 300 is disposed within a range in which the first lens unit moves in focusing. The same applies to the other object side edge surfaces 302a, 303a, and 304a of the circuit substrate 300. This makes it possible to dispose, at positions distant from the image sensor 104, the first to fourth driving coils 301b to 304b serving as a generation source of magnetic noise, without elongating the total length of the lens apparatus 200. It is therefore possible to provide a compact lens apparatus advantageous in reducing magnetic noise reaching an image sensor.

Furthermore, in the present exemplary embodiment, a rigid substrate is used as the circuit substrate 300, and the mounting portion of electric elements includes four individual mounting portions. It is therefore possible to dispose the circuit substrate 300 in the circumferential direction extending around the optical axis OA, and accommodate the circuit substrate 300 without increasing the external diameter of the lens apparatus. In addition, the mounting portion of the circuit substrate 300 includes four individual mounting portions in the present exemplary embodiment, but the mounting portion may include five or more mounting portions or three or less mounting portions as long as the mounting portions can be disposed so as to wrap around the circuit substrate 300.

(Schematic Diagram of Magnetic Noise)

Figure 6:
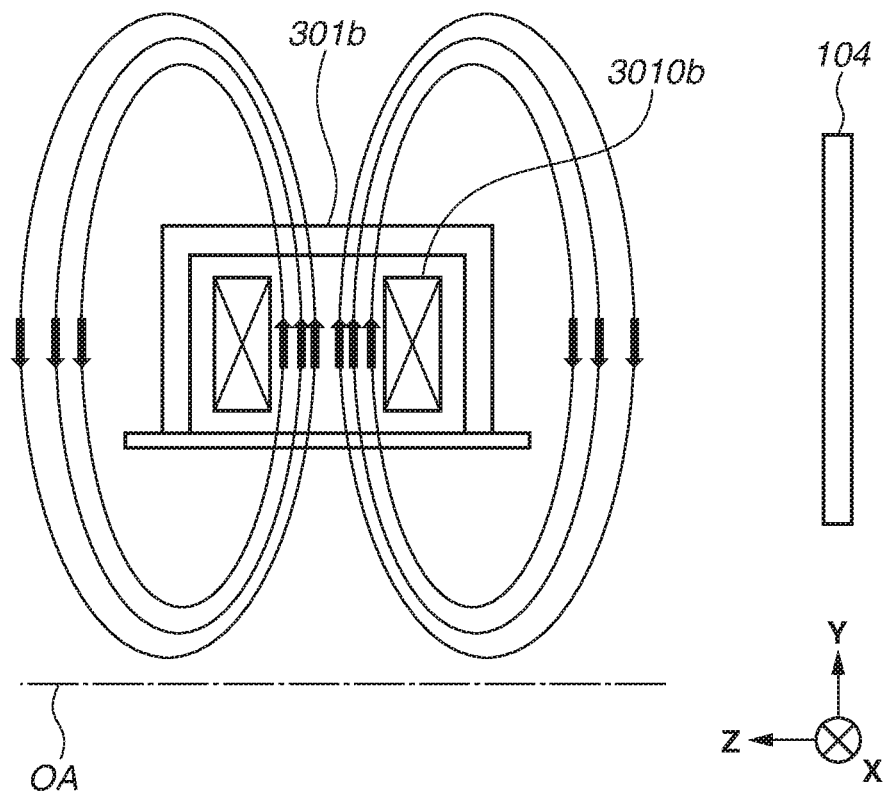
FIG. 6 is a diagram illustrating a relationship between an optical axis and magnetic noise produced by a driving coil according to the first exemplary embodiment.

FIG. 6 schematically illustrates magnetic noise produced by the first driving coil 301b according to the present exemplary embodiment. In the first driving coil 301b, an electric cable (conductive cable) 3010b is winded about a Y-axis in FIG. 6 (about an axis or a direction that is orthogonal to the optical axis OA). Because the second to fourth driving coils 302b, 303b, and 304b also have configurations similar to that of the first driving coil 301b, the description will be omitted. As illustrated in FIG. 6, magnetic noise produced by the first driving coil 301b is likely to be emitted in the Y-axis direction. In this manner, disposing the first driving coil 301b in such a manner that the electric cable is winded about the Y-axis enables further reduction in magnetic noise reaching the image sensor 104.

(Method of Connecting Circuit Substrate and Communication Substrate)

Next, a method of connecting the circuit substrate 300 and the communication substrate 212 will be described with reference to FIGS. 4 and 7.

Figure 7:
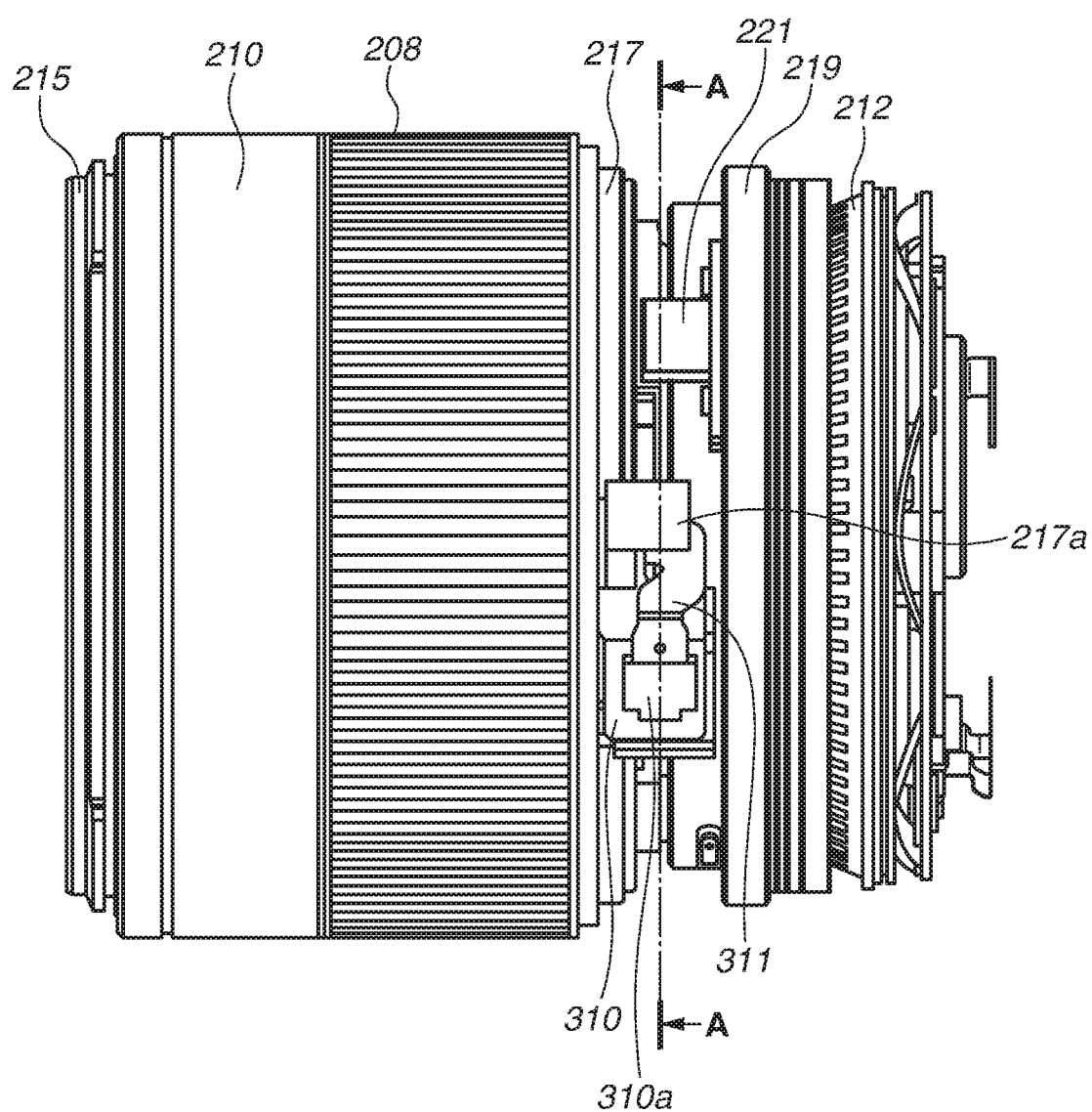
FIG. 7 is an exploded view illustrating a state in which an outer barrel according to the first exemplary embodiment is removed.
Figure 8:
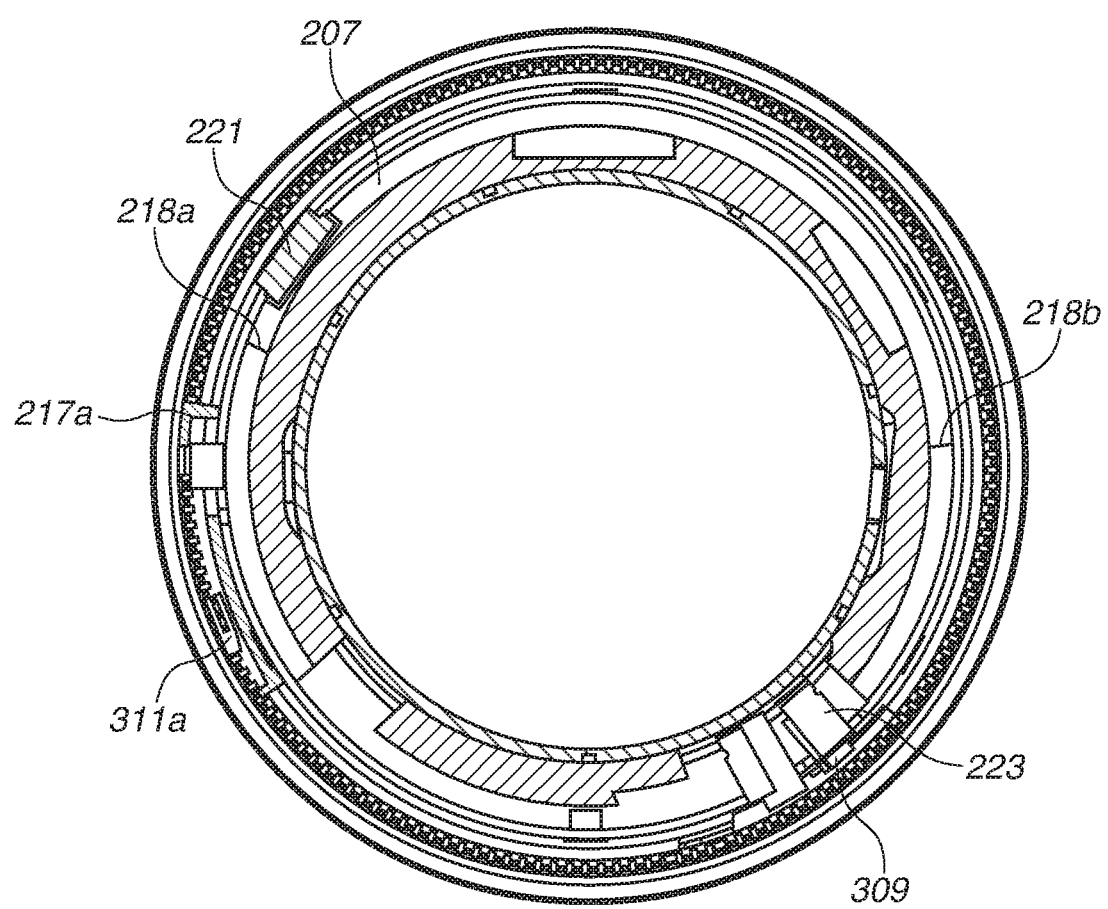
FIG. 8 is a cross-sectional view taken along an A-A portion in FIG. 7 according to the first exemplary embodiment.

FIG. 7 is an exploded view of the lens apparatus 200 illustrating a state in which an outer barrel 214 is detached. FIG. 8 is a cross-sectional view taken along an A-A portion in FIG. 7. As illustrated in FIG. 4, the circuit substrate 300 is connected with the communication substrate 212 by the communication cable 309 so that communication can be performed with each other. The communication cable 309 is connected to the circuit substrate connector 308 and the communication substrate connector 212a. In addition, the communication cable 309 adheres to and fixed to the focus fixing barrel 210 with a double-stick tape.

A stopper member 217 is a member for preventing the communication cable 309 from contacting the rotating cam barrel 207. A unit fixing barrel 218 is an irrotational member for forming a focus driving unit by holding the focus motor unit 211, an undermentioned scale barrel 219, and the like. The unit fixing barrel 218 is held by being fixed to the guide barrel 206 using a screw.

The scale barrel 219 is a member for holding a scale for detecting a rotation amount of the focus motor unit 211 using a noncontact sensor (not illustrated). In addition, the output key 221 is fixed to the scale barrel 219 using a screw.

A junction cable 310 is connected with the circuit substrate 300, and conveys, to a power cable 311, electric power for driving the focus motor unit 211 that is output from the circuit substrate 300. The power cable 311 is connected with a connector portion 310a of the junction cable 310, and supplies electric power to the focus motor unit 211. A structure 217a prevents the power cable 311 from protruding. A holding plate 223 prevents the communication cable 309 from contacting the scale barrel 219 and the cam barrel 207 that are rotating.

(Rotation Range of Output Key and Cam Barrel)

Next, a rotation range of the output key 221 and the cam barrel 207 will be described with reference to FIG. 8. Projection portions (regulating portions) 218a and 218b are provided on the unit fixing barrel 218, and regulate the rotation range of the output key 221. By the output key 221 engaged with the cam barrel 207 contacting the projection portions 218a and 218b, the rotation range of the cam barrel 207 is regulated. At this time, in the present exemplary embodiment, the rotation range of the output key 221 is set to about 140 degrees as illustrated in FIG. 8. In other words, there is a range through which the output key 221 does not pass.

This increases a degree of flexibility in installing the communication cable 309 for connecting the circuit substrate 300 and the communication substrate 212, in the lens apparatus 200. If the range through which the output key 221 does not pass is not provided unlike the present exemplary embodiment, it is necessary to lay the communication cable 309 on the external diameter side of the scale barrel 219. In this case, if a sufficient clearance from the rotating scale barrel 219 is secured, the lens apparatus 200 upsizes. In other words, by laying the communication cable 309 on the inner diameter side of the irrotational unit fixing barrel 218 as in the present exemplary embodiment, it is possible to downsize the lens apparatus 200 while preventing cable break.

In the present exemplary embodiment, the rotation range of the output key 221 is set to 140 degrees, but the rotation range is not limited to this. The rotation range may be set to any angle as long as a cable for connecting the circuit substrate 300 and the communication substrate 212 can be laid.

A second exemplary embodiment of the present invention will be described below. A lens apparatus of a second exemplary embodiment will be described using FIGS. 9 and 10.

Figure 9:
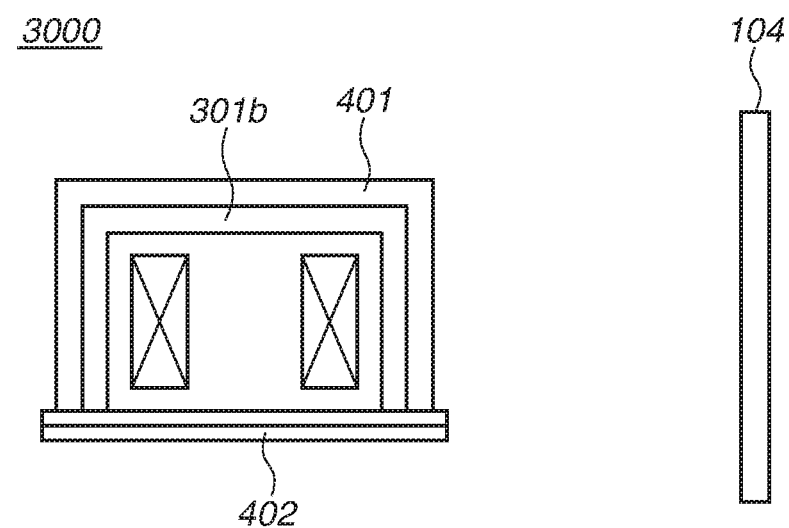
FIG. 9 is a schematic diagram illustrating a relationship between a driving coil and a magnetic shield according to a second exemplary embodiment.

FIG. 9 is a schematic diagram illustrating a partial structure of a circuit substrate 3000 according to the present exemplary embodiment. Unlike the circuit substrate 300 in the aforementioned first exemplary embodiment, the circuit substrate 3000 in the present exemplary embodiment includes a first magnetic shield (first shield member) 401 and a second magnetic shield (second shield member) 402 that are provided around a first driving coil 301b. Two magnetic shields are similarly provided around each of second to fourth driving coil 302b, 303b, and 304b.

FIGS. 10A to 10D are perspective views each illustrating the circuit substrate 3000 including the first magnetic shield 401 and the second magnetic shield 402. FIG. 10C is a diagram illustrating a state in which a flexible printed circuit board is removed from the circuit substrate 3000 illustrated in FIG. 10A. FIG. 10D is a diagram illustrating a state in which a flexible printed circuit board is removed from the circuit substrate 3000 illustrated in FIG. 10B. As illustrated in FIGS. 10A to 10D, the first magnetic shield 401 has a cross shape when being developed, and partially covers each driving coil. In addition, the second magnetic shield 402 is provided on the underside of each driving coil (opposite side of a side on which the first magnetic shield 401 is provided).

In general, the first magnetic shield 401 and the second magnetic shield 402 are formed of nonmagnetic material having high conductivity, such as copper. That is to say, material that causes a magnetic shield effect is desirably used.

By disposing magnetic shield members as in the present exemplary embodiment, it is possible to make magnetic noise produced by a driving coil less likely to reach the image sensor 104, even if the driving coil included in a circuit substrate cannot be arranged well away from the image sensor 104 due to a short total length of a lens apparatus. It is therefore possible to provide a compact lens apparatus advantageous in reducing magnetic noise reaching an image sensor.

The first magnetic shield 401 covers at least part of a driving coil in at least one directional vision of a directional vision parallel to the optical axis direction and a directional vision orthogonal to the optical axis direction. In the present exemplary embodiment, at least in the directional vision orthogonal to the optical axis direction, the entire driving coil is covered by the first magnetic shield 401. In addition, it can be said that the second magnetic shield 402 is provided on the opposite side of a side on which the first magnetic shield 401 is provided, with respect to the driving coil.

(Description about Configuration of Imaging Optical System)

A configuration of an imaging optical system mountable in the lens apparatus according to each of the aforementioned exemplary embodiments will be described with reference to FIGS. 11 to 20A and 20B. In the lens apparatuses described in the aforementioned first and second exemplary embodiments, any of imaging optical systems described in the following Numerical Examples 1 to 5 is mounted. It should be appreciated that the present invention is not limited to a lens apparatus equipped with any of the imaging optical systems described in the following Numerical Examples 1 to 5.

(Descriptions of Drawings)

Figure 11:
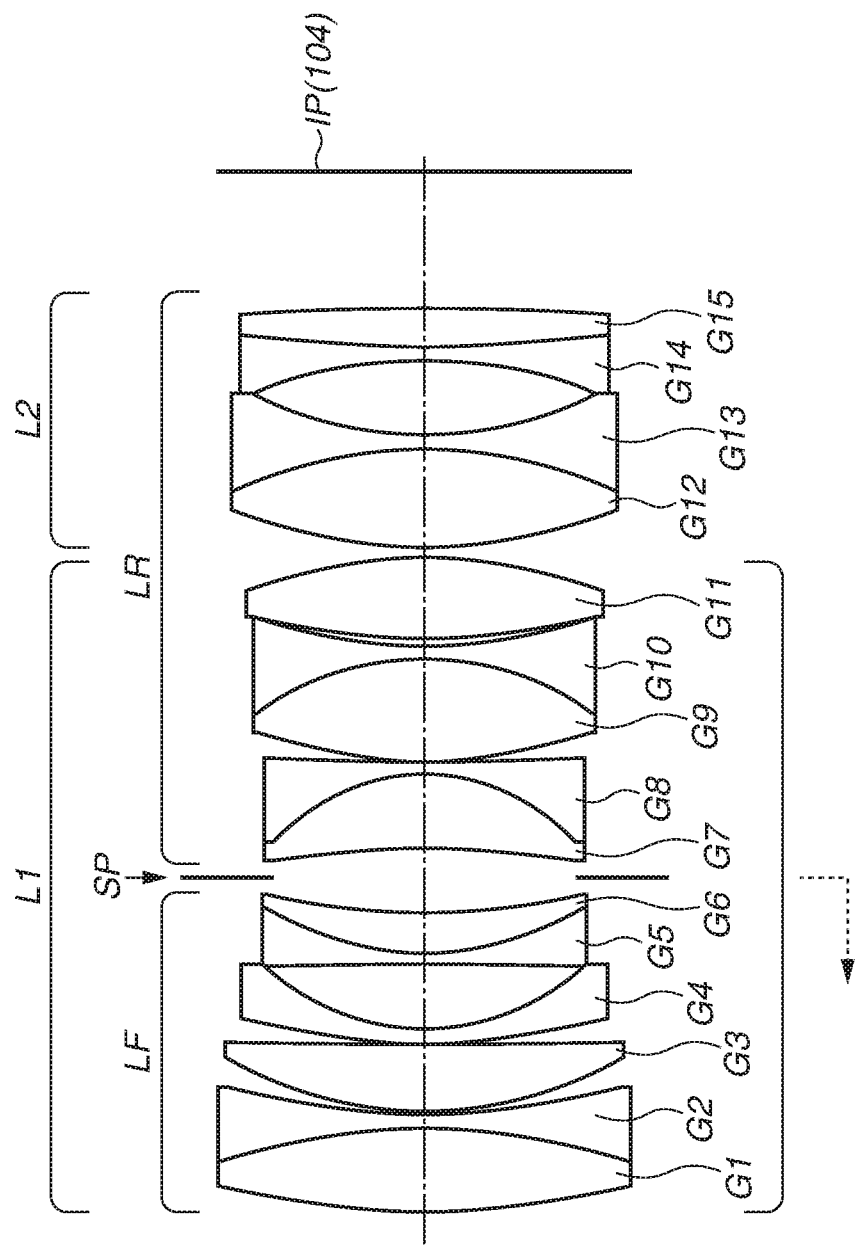
FIG. 11 is a lens cross-sectional view according to Numerical Example 1.
Figure 13:
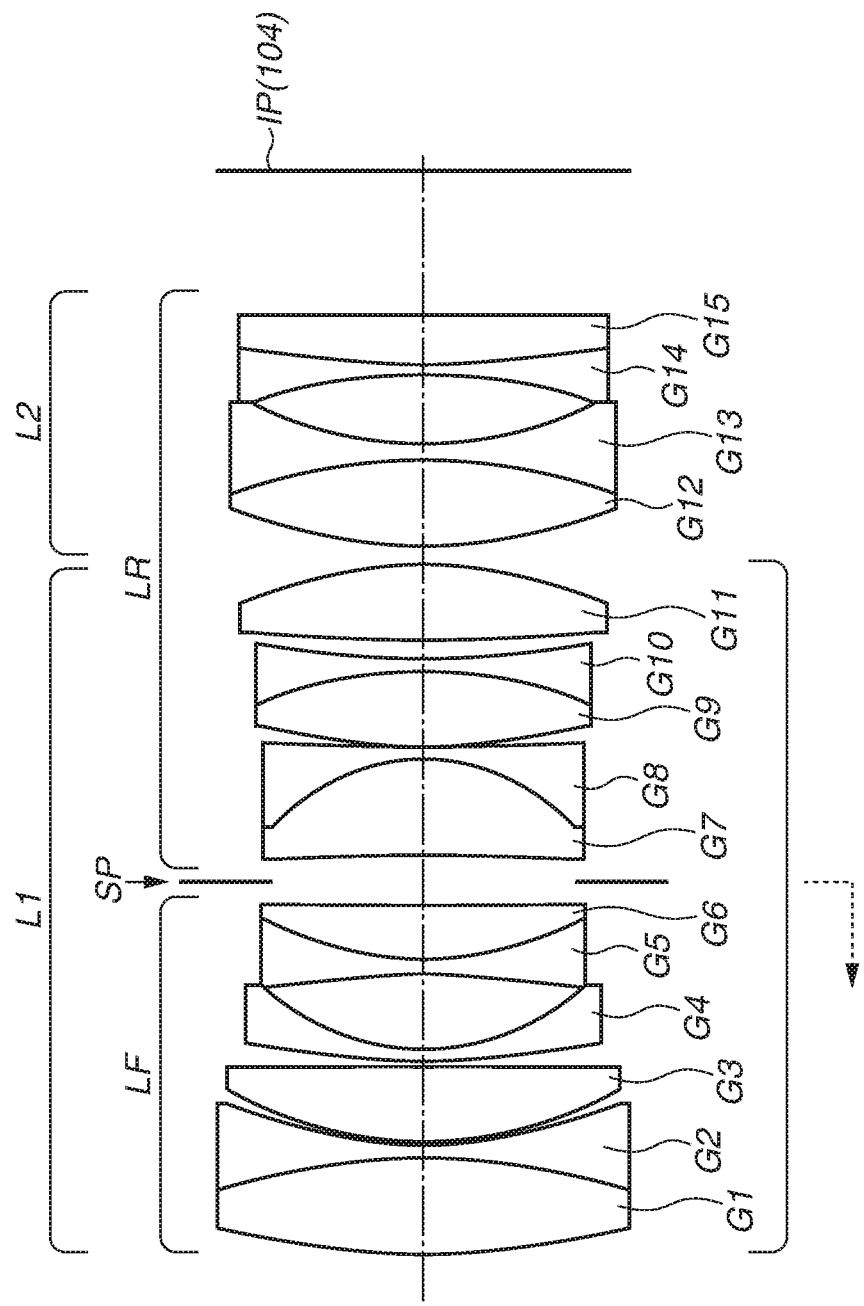
FIG. 13 is a lens cross-sectional view according to Numerical Example 2.
Figure 14A:
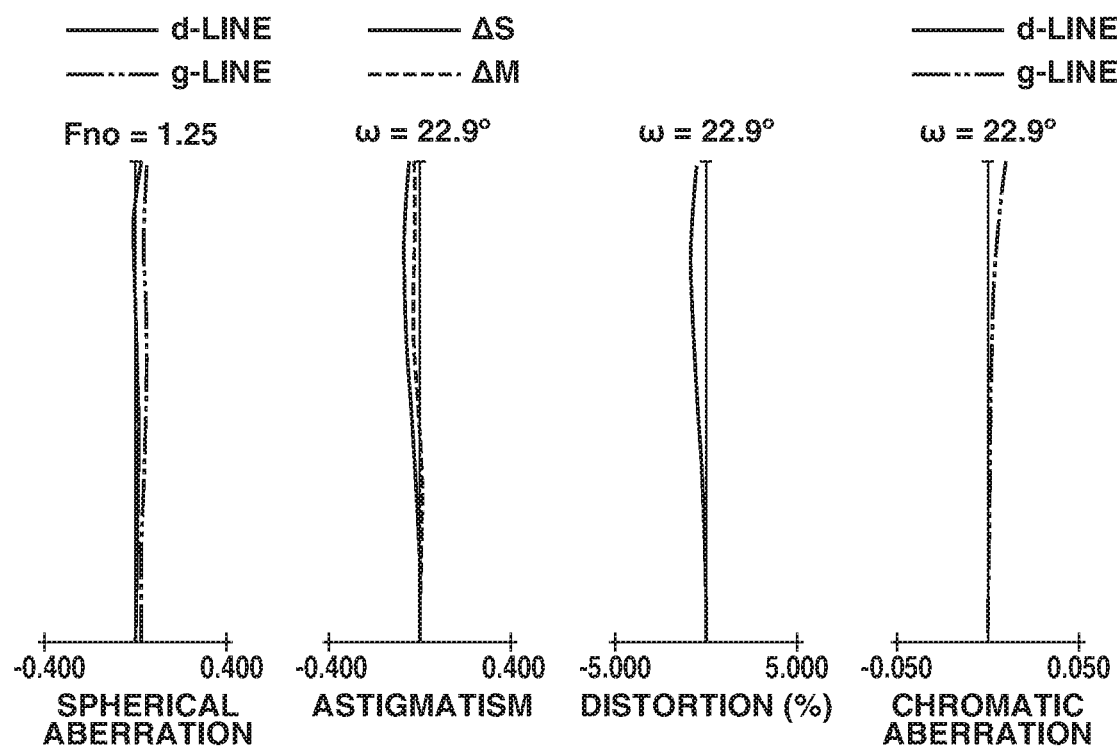
FIGS. 14A and 14B are aberration diagrams respectively illustrating a state in which focus is at infinity, and a state in which focus is at a close distance, according to Numerical Example 2.
Figure 14B:
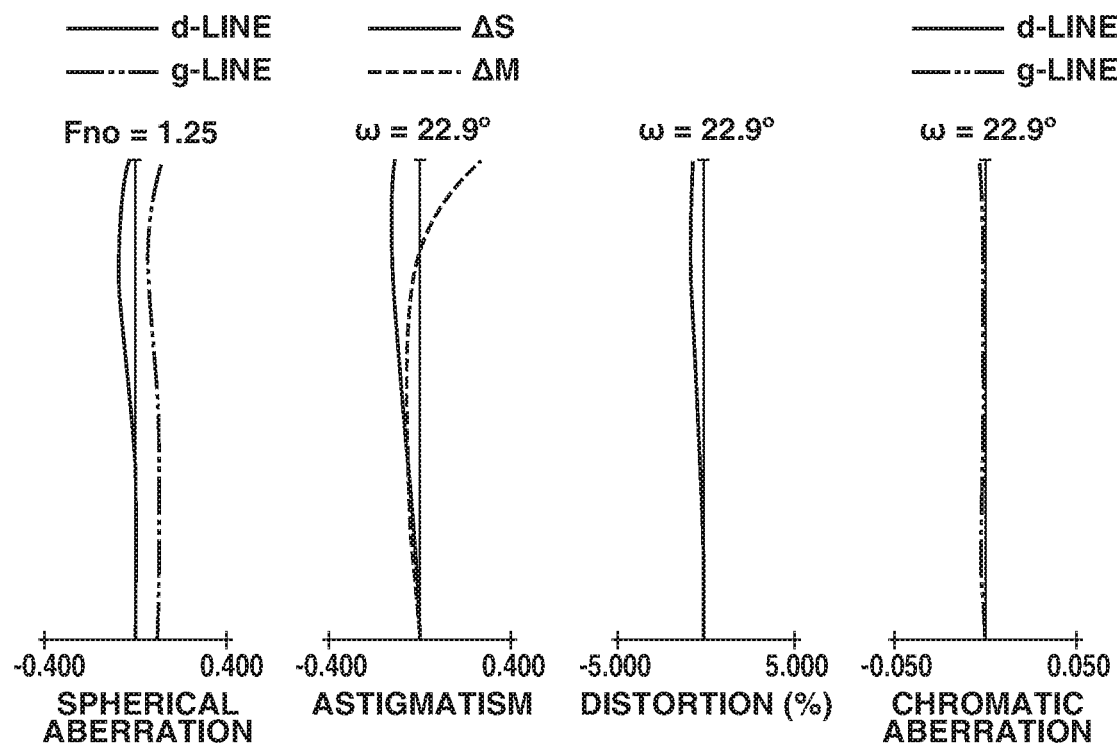

FIG. 11 is a lens cross-sectional view of an optical system according to Numerical Example 1. FIGS. 12A and 12B are aberration diagrams respectively illustrating a state in which focus is at infinity, and a state in which focus is at a close distance, according to Numerical Example 1. FIG. 13 is a lens cross-sectional view of an optical system according to Numerical Example 2. FIGS. 14A and 14B are aberration diagrams respectively illustrating a state in which focus is at infinity, and a state in which focus is at a close distance, according to Numerical Example 2.

Figure 16A:
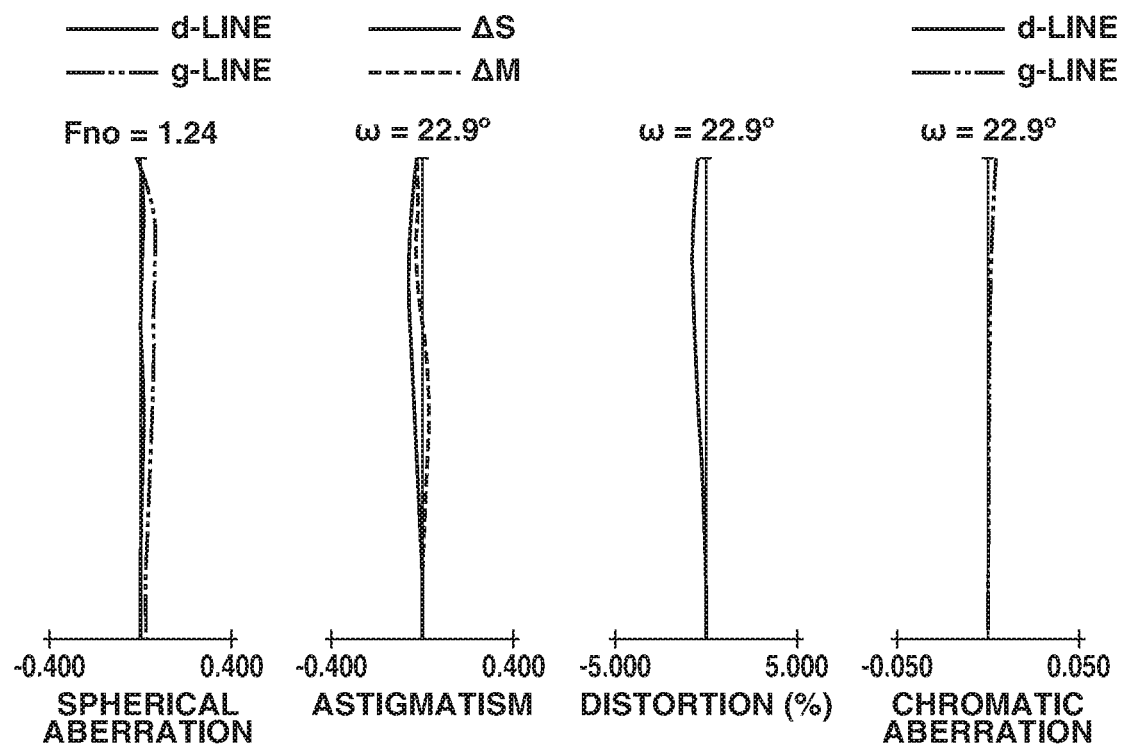
FIGS. 16A and 16B are aberration diagrams respectively illustrating a state in which focus is at infinity, and a state in which focus is at a close distance, according to Numerical Example 3.
Figure 16B:
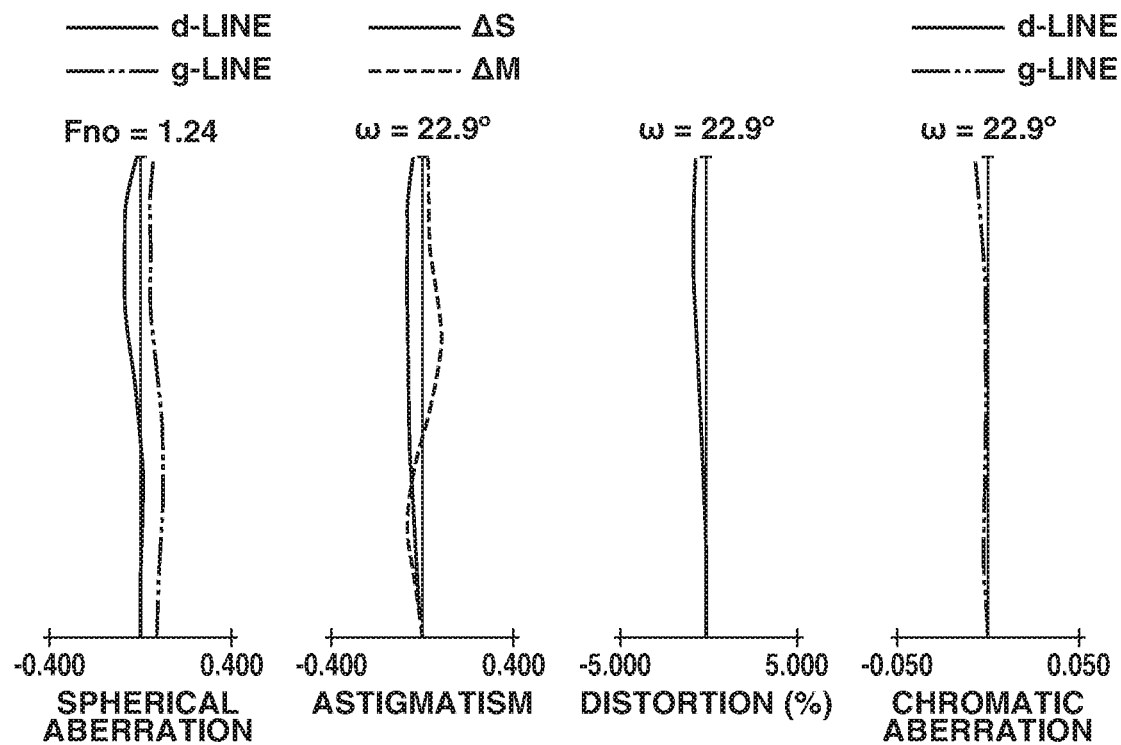
Figure 17:
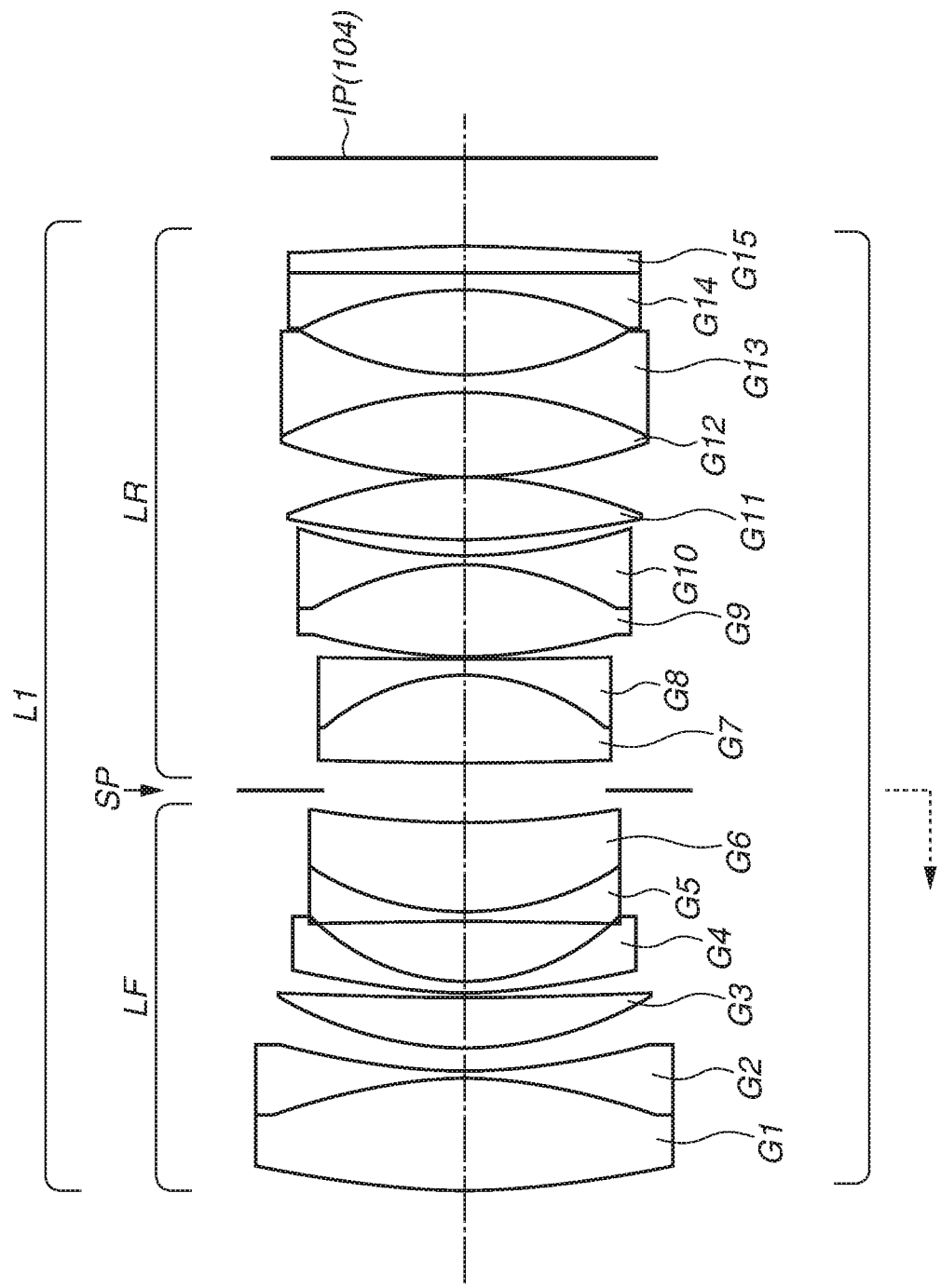
FIG. 17 is a lens cross-sectional view according to Numerical Example 4.
Figure 18A:
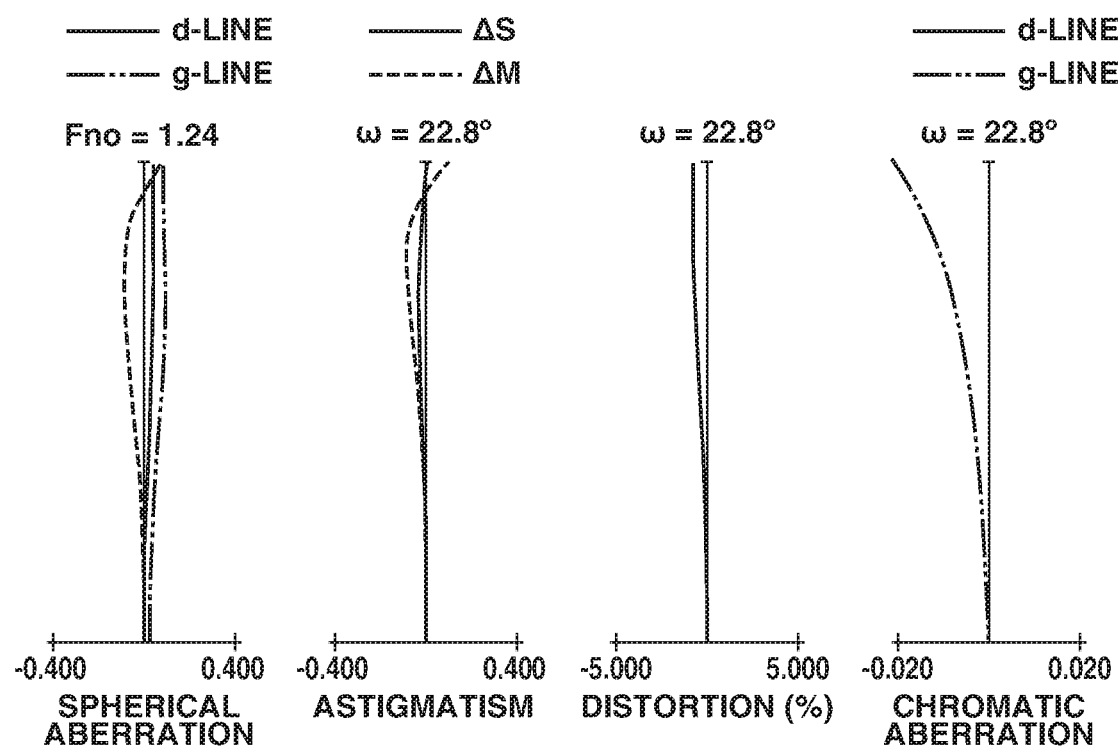
FIGS. 18A and 18B are aberration diagrams respectively illustrating a state in which focus is at infinity, and a state in which focus is at a close distance, according to Numerical Example 4.
Figure 18B:
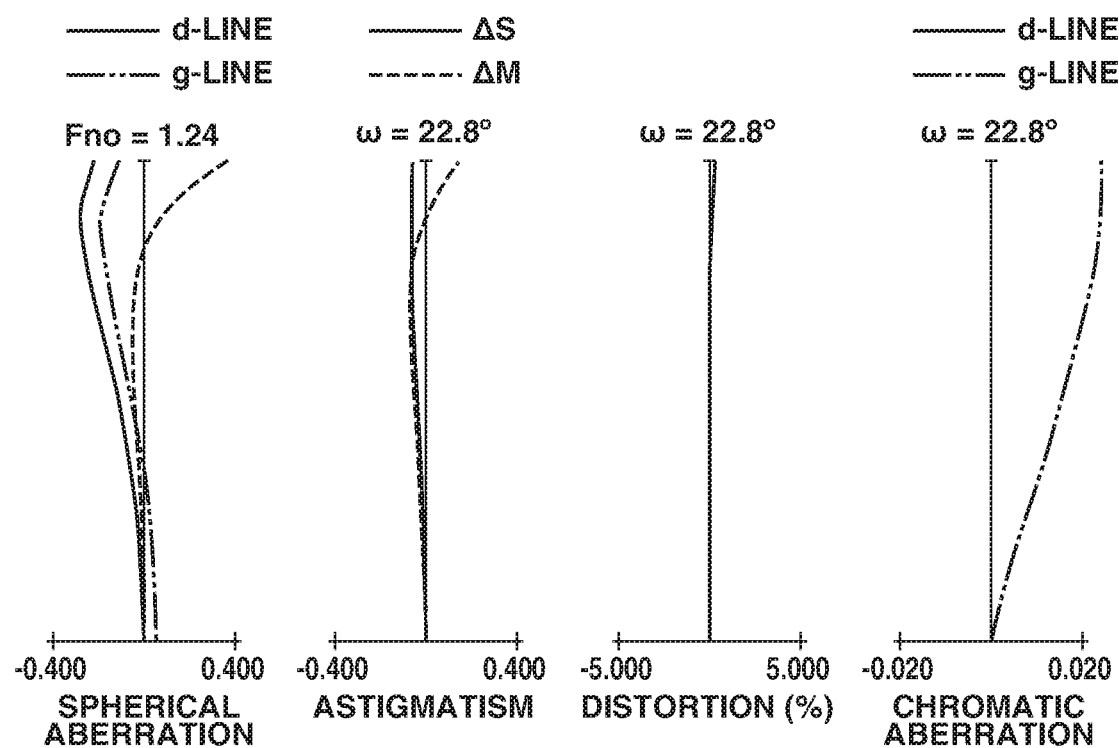
Figure 19:
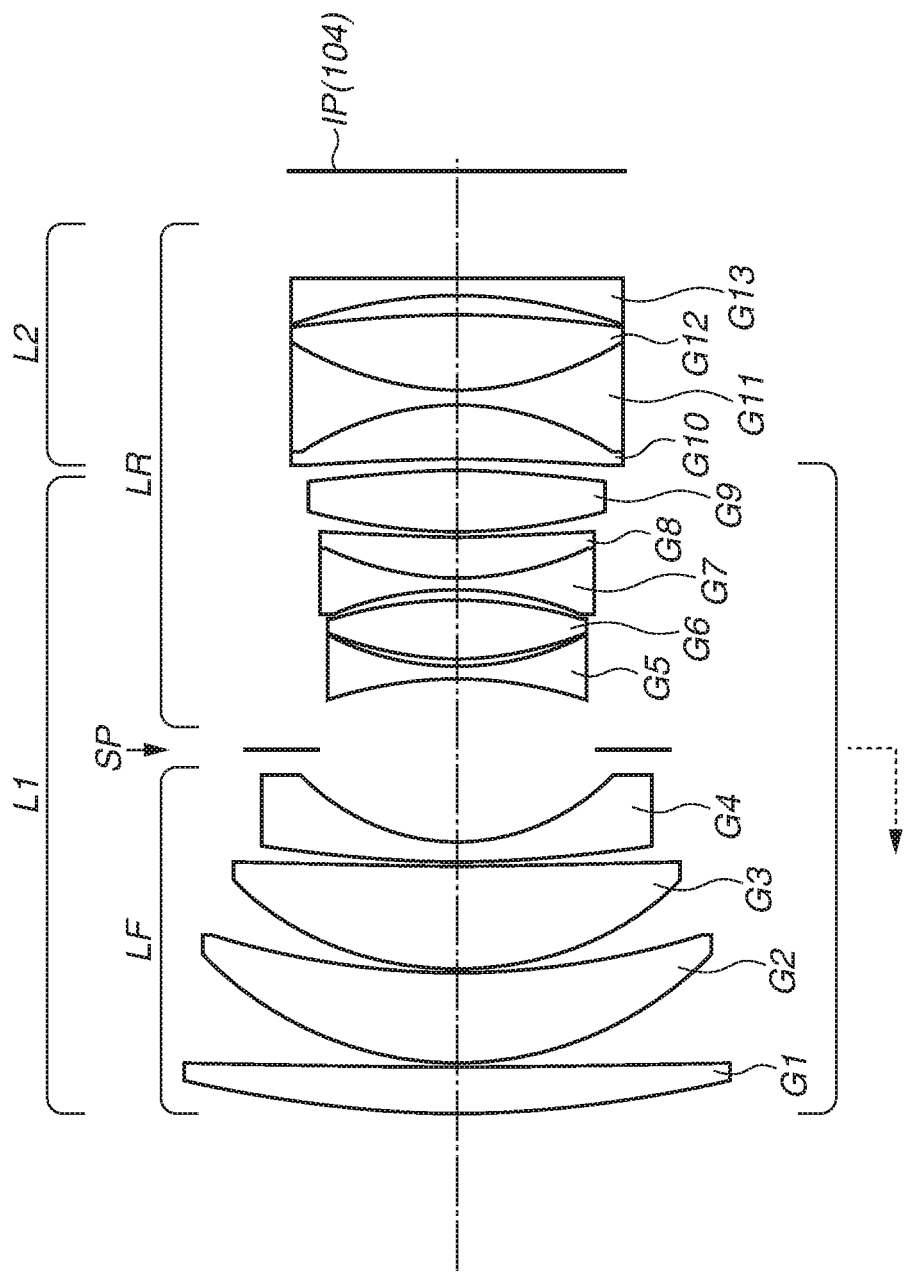
FIG. 19 is a lens cross-sectional view according to Numerical Example 5.
Figure 20A:
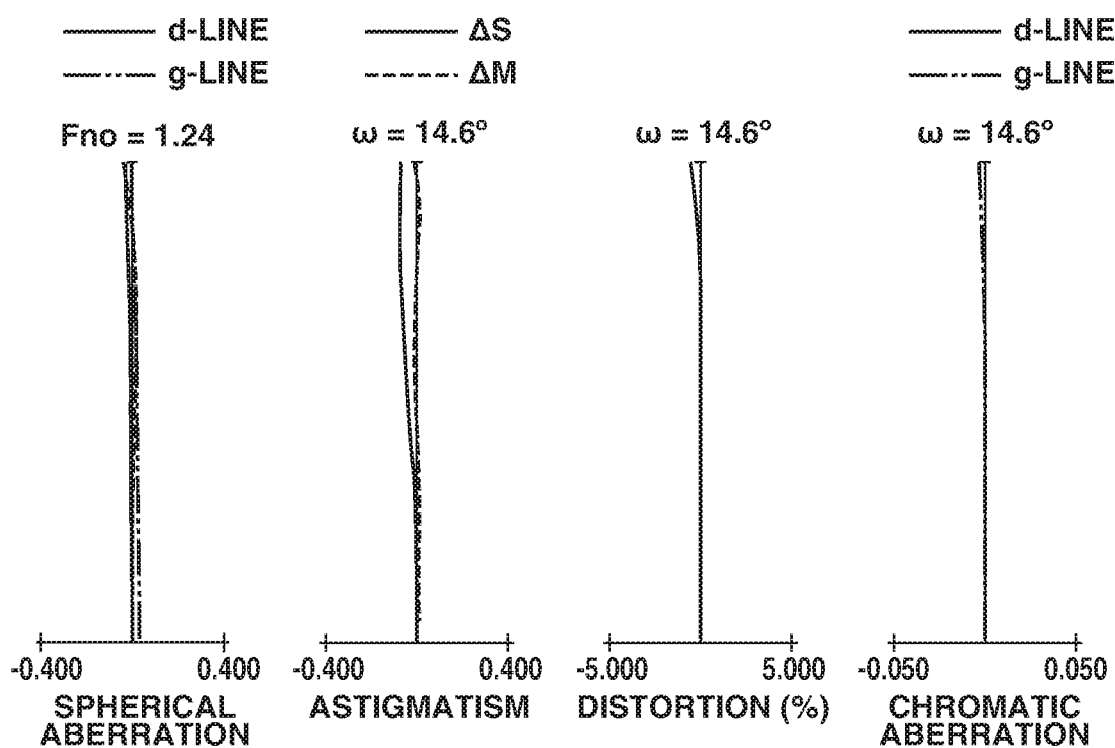
FIGS. 20A and 20B are aberration diagrams respectively illustrating a state in which focus is at infinity, and a state in which focus is at a close distance, according to Numerical Example 5.
Figure 20B:
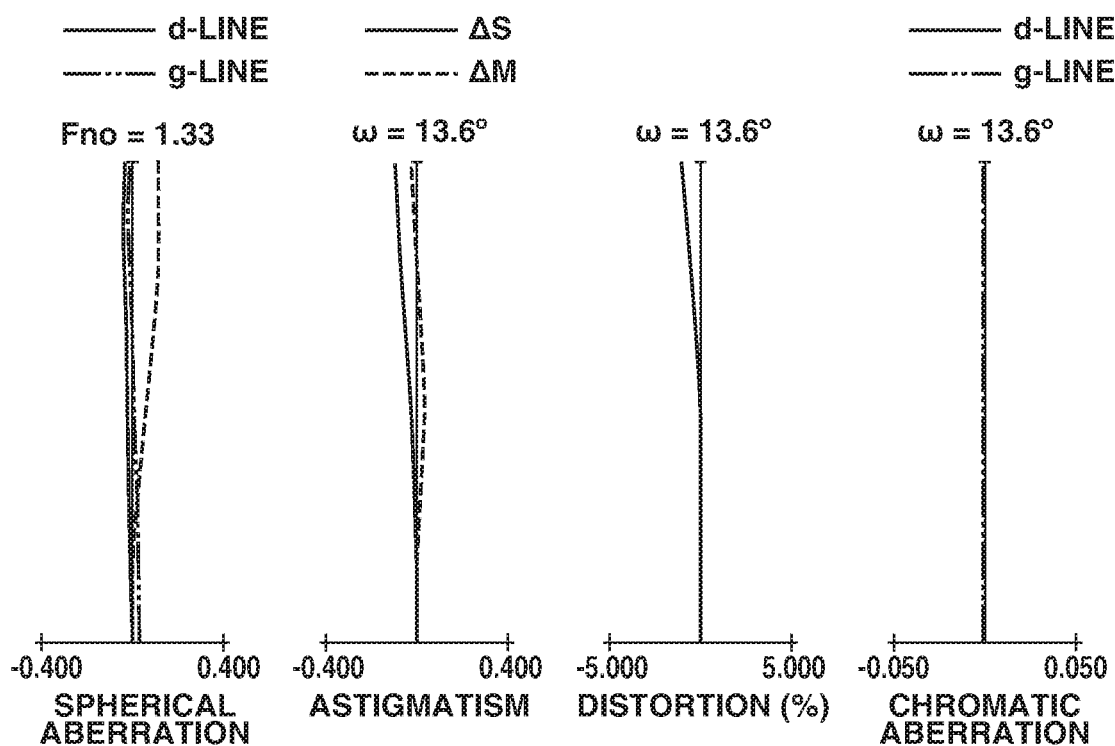

FIG. 15 is a lens cross-sectional view of an optical system according to Numerical Example 3. FIGS. 16A and 16B are aberration diagrams respectively illustrating a state in which focus is at infinity, and a state in which focus is at a close distance, according to Numerical Example 3. FIG. 17 is a lens cross-sectional view of an optical system according to Numerical Example 4. FIGS. 18A and 18B are aberration diagrams respectively illustrating a state in which focus is at infinity, and a state in which focus is at a close distance, according to Numerical Example 4. FIG. 19 is a lens cross-sectional view of an optical system according to Numerical Example 5. FIGS. 20A and 20B are aberration diagrams respectively illustrating a state in which focus is at infinity, and a state in which focus is at a close distance, according to Numerical Example 5.

In the aberration diagrams, reference numerals "ΔM" and "ΔS" denote a meridional image plane and a sagittal image plane, respectively. In addition, distortion aberration is represented by d-line. A reference code "ω" denotes a half field angle (half value of an imaging field angle) (degree) and a reference code "Fno" denotes an F-number.

In the lens cross-sectional views, the left side corresponds to an object side (front side) and the right side corresponds to an image side (rear side). A reference code "i" denotes an order of a lens unit from the object side, and a reference code "Li" denotes an i-th lens unit. In the lens cross-sectional views, a reference code "LF" denotes a front lens unit (or front lens subunit) having positive refractive power, and a reference code "LR" denotes a rear lens unit (or rear lens subunit) having positive refractive power.

In Numerical Examples 1 to 3 and 5, a reference code L1 denotes a first lens unit (or first lens subunit) having positive refractive power, and a reference code L2 denotes a second lens unit (or second lens subunit) having positive refractive power. In Numerical Example 4, a reference code L1 denotes a first lens unit (or first lens subunit) having positive refractive power.

A reference code "SP" denotes a stop (or iris stop) and a reference code "IP (104)" denotes an image plane on which a photosensitive surface of an image sensor such as a CCD sensor and a CMOS sensor is positioned.

An imaging optical system of each numerical example includes, in order from the object side to the image side, a front lens unit LF having positive refractive power, an aperture stop SP, and a rear lens unit LR having positive refractive power.

In Numerical Examples 1 to 3 and 5, a reference code "L1" denotes a first lens unit that has positive refractive power and moves in focusing, and a reference code "L2" denotes a second lens unit that has positive refractive power and does not move in focusing. In Numerical Example 4, a reference code "L1" denotes a first lens unit that has positive refractive power and moves in focusing. In Numerical Example 4, the entire optical system moves in focusing. In each numerical example, the first lens unit L1 corresponds to a focus lens unit that moves in the optical axis direction in focusing.

The lens apparatuses according to the aforementioned first and second exemplary embodiments each include the first lens unit L1 and the second lens unit L2 as in Numerical Examples 1 to 3 and 5. Nevertheless, focusing may be performed by the entire optical system being moved as in Numerical Example 4.

In each numerical example, in focusing from infinity to a near distance (close distance) object, the first lens unit L1 is moved toward the object side as indicated by a dotted arrow.

(Description of Conditional Expressions)

In the imaging optical system of each numerical example, one or more conditional expressions of the following conditional expressions are desirably satisfied.

The definitions of reference codes in the conditional expressions will be described. An F-number in a state at an infinite object distance of the imaging optical system (state in which focus is at infinity) is defined as "Fno", and a focal length of the entire system in a state at the infinite object distance of the imaging optical system is defined as "f". A focal length of the front lens unit LF is defined as "ff" and a focal length of the rear lens unit LR is defined as "fr". A movement amount of the first lens unit moving in focusing from an infinity focusing state (state in which focus is at infinity) to a close-distance focusing state (state in which focus is at a close distance) is defined as "Δd". Among a plurality of lenses included in the imaging optical system, a diameter (an effective diameter) of a lens having the largest diameter is defined as "Dmax", and a diameter (an effective diameter) of a lens having the smallest diameter is defined as "Dmin".

At this time, the imaging optical system of each numerical example satisfies at least one of the following conditional expressions.

$$0.9 \leq Fno \leq 2.8 \tag{1}$$

$$0.1 \leq fr/ff \leq 0.7 \tag{2}$$

$$0.1 \leq |\Delta d/f| \leq 0.5 \tag{3}$$

$$0.1 \leq |BF/f| \leq 0.6 \tag{4}$$

$$0.40 \leq D\min/D\max < 1.0 \tag{5}$$

Hereinafter, the technical senses of Conditional Expressions (1) to (5) will be described.

Conditional Expression (1) defines an appropriate range of an F-number of the imaging optical system.

If a value of an F-number exceeds an upper limit of Conditional Expression (1), an aperture ratio declines. It therefore becomes easier to correct various aberrations such as spherical aberration in particular. This is advantageous in downsizing such as reducing the number of lenses and shortening a total optical length of the imaging lens system. Nevertheless, it becomes difficult to achieve a large aperture ratio, which is undesirable for an imaging optical system having a large aperture ratio.

If a value of an F-number falls below a lower limit of Conditional Expression (1), a lens diameter becomes larger and it becomes difficult to correct various aberrations such as spherical aberration in particular. It is therefore necessary to increase the number of lenses or extend a total optical length for correcting the aberrations. The entire imaging optical system consequently upsizes, which is undesirable.

Conditional Expression (2) is a conditional expression that appropriately defines a focal length of the front lens unit LF and a focal length of the rear lens unit LR for further achieving correction of various aberrations including spherical aberration.

If a value of fr/ff exceeds an upper limit of Conditional Expression (2), a focal length of the front lens unit LF becomes shorter and a focal length of the rear lens unit LR becomes longer. It consequently becomes difficult to appropriately correct spherical aberration generated in the front lens unit LF, which is undesirable.

If a value of fr/ff falls below a lower limit of Conditional Expression (2), a focal length of the front lens unit LF becomes longer and a focal length of the rear lens unit LR becomes shorter. It consequently becomes difficult to suppress spherical aberration generated in the rear lens unit LR, which is undesirable.

Conditional Expression (3) is a conditional expression that appropriately defines a movement amount of the first lens unit L1 serving as a focusing unit, for reducing variations in various aberrations such as spherical aberration that are caused by focusing, while downsizing the entire optical system.

If a value of $|\Delta d/f|$ exceeds an upper limit of Conditional Expression (3), a movement amount of the first lens unit L1 becomes longer, and a moving distance of the first lens unit L1 becomes too large when focus is put on a near distance object. It therefore becomes difficult to downsize the entire optical system, which is undesirable.

If a value of $|\Delta d/f|$ falls below a lower limit of Conditional Expression (3), a movement amount of the first lens unit L1 becomes smaller, and variations in various aberrations including spherical aberration that are caused in focusing become too large. It consequently becomes difficult to achieve high optical performance throughout the entire in-focus range from infinity to a near distance, which is undesirable. In addition, if a value of $|\Delta d/f|$ falls below the lower limit of Conditional Expression (3), a movement amount of the first lens unit L1 becomes smaller and the first lens unit L1 becomes too sensitive. Thus, variations in performance that are caused by manufacturing errors become large, which is undesirable.

Conditional Expression (4) is a conditional expression for appropriately correcting various aberrations while downsizing the entire optical system.

If a value of $|BF/f|$ exceeds an upper limit of Conditional Expression (4), back focus becomes longer and it becomes difficult to downsize the entire optical system, which is undesirable.

If a value of $|BF/f|$ falls below a lower limit of Conditional Expression (4), back focus becomes shorter and a final lens of the imaging lenses may collide with the image sensor IP when a lens is replaced, which is undesirable.

Conditional Expression (5) is a conditional expression with which a difference between the effective diameters of the largest lens and the smallest lens is represented. Falling below a lower limit of Conditional Expression (5) means that a difference between the effective diameters of the largest lens and the smallest lens is large and an external shape of the imaging optical system is a constricted shape. If the external shape of the imaging optical system is a constricted shape, it is considered to provide a circuit substrate at a constricted point. Nevertheless, because the imaging optical system in each numerical example satisfies Conditional Expression (5) and the external shape is not constricted so much, a circuit substrate is provided at a position described in the aforementioned first and second exemplary embodiments.

If the numerical value ranges of Conditional Expressions (1) to (5) are set as follows, the aforementioned effects intended by the conditional expressions can be further obtained, which is desirable.

$$1.0 \leq Fno \leq 2.0 \quad (1a)$$

$$0.2 \leq fr/ff \leq 0.7 \quad (2a)$$

$$0.1 \leq |\Delta d/f| \leq 0.5 \quad (3a)$$

$$0.1 \leq |BF/f| \leq 0.4 \quad (4a)$$

$$0.60 \leq D\min/D\max < 1.0 \quad (5a)$$

The numerical value ranges of Conditional Expressions (1) to (5) may be set as follows.

$$1.0 \leq Fno \leq 1.5 \quad (1b)$$

$$0.2 \leq fr/ff \leq 0.4 \quad (2b)$$

$$0.1 \leq |\Delta d/f| \leq 0.3 \quad (3b)$$

$$0.15 \leq |BF/f| \leq 0.35 \quad (4b)$$

$$0.65 \leq D\min/D\max < 1.0 \quad (5b)$$

(Description about Desirable Lens Configuration)

In the imaging optical system of each numerical example, by forming the components as described above, it becomes possible to achieve downsizing of the entire lens system while keeping a large aperture ratio. Furthermore, it becomes possible to appropriately correct various aberrations including spherical aberration, and realize an optical system having high optical performance.

In the imaging optical system of each numerical example, the following lens configuration is employed to achieve high optical performance throughout the entire imaging range while downsizing the entire lens system. More specifically, the employed lens configuration includes, in order from an object side to an image side, the front lens unit LF having positive refractive power, the aperture stop SP, and the rear lens unit LR having positive refractive power. With this configuration, the downsizing of an aperture stop diameter and appropriate aberration correction can be both achieved even when a diameter becomes large.

In the imaging optical system of each numerical example, the first lens unit L1 is moved toward the object side in focusing from infinity to a near distance. By employing a front focus method of moving the first lens unit L1, it is possible to appropriately suppress variations in various aberrations including spherical aberration occurring in focusing, while achieving downsizing of a lens external diameter such as downsizing of a front lens diameter in particular.

The front lens unit LF desirably includes six lenses including, in order from an object side to an image side, a cemented lens of a positive lens G1 and a negative lens G2, a positive lens G3, a negative lens G4, and a cemented lens of a negative lens G5 and a positive lens G6. By forming the front lens unit LF in this manner, it is possible to appropriately correct spherical aberration and astigmatism while achieving downsizing of a lens external diameter and an aperture stop diameter even with a large diameter.

The rear lens unit LR desirably includes the following nine lenses in order from an object side to an image side. More specifically, the nine lenses include a cemented lens of a positive lens G7 and a negative lens G8, a cemented lens of a positive lens G9 and a negative lens G10, a positive lens G11, a cemented lens of a positive lens G12 and a negative lens G13, and a cemented lens of a negative lens G14 and a positive lens G15. By forming the rear lens unit LR in this manner, it is possible to appropriately perform the correction of axial chromatic aberration and magnification chromatic aberration, and the correction of spherical aberration and astigmatism.

Specific lens data in each numerical example are listed below. In each numerical example, a reference code "i" denotes an order of a surface from the object side. A reference code "R" denotes a curvature radius of a lens surface, a reference code "d" denotes a lens thickness and an air interval between an i-th surface and an (i+1)-th surface, and reference codes "nd" and "vd" denote refractive index and Abbe number with respect to d-line, respectively. A reference code "D" denotes an effective diameter of each lens surface.

An aspherical surface shape is represented by the following expression, where a reference code "k" denotes eccentricity, reference codes "A4", "A6", "A8", and "A10" denote aspherical surface coefficients, and a reference code "x" denotes a displacement in the optical axis direction at a position of a height "h" from the optical axis with respect to a surface vertex:

$$x=(h^2/R)/[1+[1-(1+k)(h/R)^2]^{1/2}]+A4h^4+A6h^6+A8h^8+A10h^{10}.$$

In the above expression, a reference code "R" denotes paraxial curvature radius. The effective diameter corresponds to a half value of the largest diameter of each lens surface (refracting surface) or a half value of a width in an optical axis orthogonal direction of a region in each lens surface into which a light ray having the highest light ray height makes an entry.

In each numerical example, back focus (BF) is represented by an air conversion length of a distance from a lens final surface to a paraxial image plane when focus is at infinity. The total lens length is obtained by adding the back focus to a distance from a surface provided closest to an object when focus is at infinity, up to the final lens surface. The total lens length is not an air conversion length but a physical distance. In addition, correspondence with the aforementioned conditional expressions in each numerical example is shown in Table 1.

Numerical Example 1

| Unit: mm | | | | | |
|---|---|---|---|---|---|
| Surface data | | | | | |
| Surface number | r | d | nd | vd | D |
| 1* | 82.909 | 8.39 | 1.76802 | 49.2 | 41.53 |
| 2 | −68.211 | 1.50 | 1.73800 | 32.3 | 41.04 |
| 3 | 77.682 | 0.20 | | | 39.69 |
| 4 | 40.481 | 6.87 | 1.95375 | 32.3 | 39.87 |
| 5 | 855.015 | 0.20 | | | 38.95 |
| 6 | 74.822 | 1.40 | 1.65412 | 39.7 | 36.66 |
| 7 | 25.210 | 6.56 | | | 32.59 |
| 8 | −1195.622 | 1.20 | 1.66565 | 35.6 | 32.44 |
| 9 | 31.561 | 4.14 | 2.00100 | 29.1 | 31.49 |
| 10 | 75.602 | 3.47 | | | 30.99 |
| 11 (stop) | ∞ | 3.09 | | | |
| 12 | −92.693 | 7.53 | 1.43875 | 94.7 | 30.11 |
| 13 | −21.093 | 1.20 | 1.72047 | 34.7 | 29.95 |
| 14 | 349.334 | 0.20 | | | 32.01 |
| 15 | 55.420 | 10.37 | 1.76385 | 48.5 | 33.29 |
| 16 | −29.287 | 1.30 | 1.66565 | 35.6 | 33.31 |
| 17 | 55.742 | 0.71 | | | 34.08 |
| 18* | 65.419 | 8.32 | 1.85400 | 40.4 | 34.32 |
| 19* | −49.838 | (variable) | | | 35.84 |
| 20 | 52.651 | 10.03 | 1.88300 | 40.8 | 38.43 |
| 21 | −47.216 | 1.50 | 1.66565 | 35.6 | 37.95 |
| 22 | 41.182 | 7.53 | | 34.70 | |
| 23 | −48.251 | 1.40 | 1.61340 | 44.3 | 34.71 |
| 24 | 151.332 | 3.90 | 1.85400 | 40.4 | 36.44 |
| 25* | −163.746 | 14.00 | | | 36.94 |
| Image plane ∞ | | | | | |

Aspherical surface data

First surface

K = 0.00000e+000 A4 = −1.39341e−006 A6 = −4.81896e−010
A8 = 7.22917e−014 A10 = 2.22678e−017
Eighteenth surface K = 0.00000e+000 A4 = −2.25923e−006 A6 = 8.73754e−010
A8 = −3.92386e−012 A10 = −8.48899e−018
Nineteenth surface K = 0.00000e+000 A4 = 1.43503e−006 A6 = 8.01071e−010
A8 = −1.43275e−012
Twenty-fifth surface K = 0.00000e+000 A4 = 2.90301e−006 A6 = 2.73324e−010
A8 = 1.09277e−011 A10 = −1.31337e−014 A12 = 5.68359e−018

| Various kinds of data | |
|---|---|
| Focal length | 51.50 |
| F-number | 1.24 |
| Field angle | 22.79 |
| Image height | 21.64 |
| Total lens length | 106.00 |
| BF | 14.00 |

| | Infinity | Close distance |
|---|---|---|
| d19 | 1.00 | 13.22 |

| Lens unit data | | |
|---|---|---|
| Group | Start surface | Focal length |
| LF | 1 | 172.21 |
| Stop | 11 | ∞ |
| LR | 12 | 45.97 |
| L1 | 1 | 62.11 |
| L2 | 20 | 614.51 |

-continued

Unit: mm

Single lens data

| Lens | Start surface | Focal length |
|---|---|---|
| 1 | 1 | 49.93 |
| 2 | 2 | −49.00 |
| 3 | 4 | 44.37 |
| 4 | 6 | −58.78 |
| 5 | 8 | −46.18 |
| 6 | 9 | 51.70 |
| 7 | 12 | 60.31 |
| 8 | 13 | −27.57 |
| 9 | 15 | 26.49 |
| 10 | 16 | −28.67 |
| 11 | 18 | 34.26 |
| 12 | 20 | 29.58 |
| 13 | 21 | −32.82 |
| 14 | 23 | −59.49 |
| 15 | 24 | 92.62 |

Numerical Example 2

Unit: mm

Surface data

| Surface number | r | d | nd | vd | D |
|---|---|---|---|---|---|
| 1* | 80.110 | 9.67 | 1.80400 | 46.58 | 41.50 |
| 2 | −68.243 | 1.64 | 1.68893 | 31.07 | 40.45 |
| 3 | 52.862 | 0.20 | | | 38.47 |
| 4 | 42.184 | 7.47 | 2.00100 | 29.13 | 38.64 |
| 5 | 2510.576 | 0.70 | | | 37.40 |
| 6 | 99.979 | 1.60 | 1.65412 | 39.68 | 35.36 |
| 7 | 24.508 | 7.45 | | | 31.43 |
| 8 | −101.919 | 1.34 | 1.66565 | 35.64 | 31.36 |
| 9 | 34.799 | 5.56 | 1.95375 | 32.32 | 31.67 |
| 10 | 516.053 | 2.44 | | | 31.46 |
| 11 (stop) | ∞ | 2.58 | | | |
| 12 | −1398.232 | 10.02 | 1.49700 | 81.54 | 30.74 |
| 13 | −20.985 | 1.29 | 1.73800 | 32.26 | 30.40 |
| 14 | 251.143 | 0.44 | | | 32.08 |
| 15 | 87.566 | 7.29 | 1.76385 | 48.51 | 32.50 |
| 16 | −43.447 | 1.28 | 1.66565 | 35.64 | 32.70 |
| 17 | 105.692 | 1.79 | | | 33.00 |
| 18* | 161.695 | 7.96 | 1.88300 | 40.80 | 33.70 |
| 19 | −42.423 | (variable) | | | 35.90 |
| 20 | 54.474 | 8.77 | 1.88300 | 40.80 | 38.50 |
| 21 | −60.531 | 1.54 | 1.59551 | 39.24 | 38.00 |
| 22 | 40.560 | 7.14 | | | 35.10 |
| 23 | −58.170 | 1.21 | 1.67300 | 38.15 | 35.10 |
| 24 | 105.985 | 5.08 | 1.80400 | 46.58 | 36.40 |
| 25* | −216.191 | 14.60 | | | 36.96 |
| Image plane | ∞ | | | | |

Aspherical surface data

First surface

K = 0.00000e+000 A4 = −1.44652e−006 A6 = −1.02693e−009
A8 = 1.91678e−012 A10 = −3.07794e−015 A12 = 2.00476e−018

Eighteenth surface

K = 0.00000e+000 A4 = −2.17027e−006 A6 = 4.00496e−009
A8 = −1.90948e−011 A10 = 4.86536e−014 A12 = −4.89586e−017

Twenty-fifth surface

K = 0.00000e+000 A4 = 3.50064e−006 A6 = −5.98670e−010
A8 = 1.34319e−011 A10 = −2.56798e−014 A12 = 2.59930e−017

-continued

Unit: mm

Various kinds of data

| | |
|---|---|
| Focal length | 51.10 |
| F-number | 1.25 |
| Field angle | 22.95 |
| Image height | 21.64 |
| Total lens length | 111.01 |
| BF | 14.60 |

| | Infinity | Close distance |
|---|---|---|
| d19 | 1.95 | 16.11 |

Lens unit data

| Group | Start surface | Focal length |
|---|---|---|
| LF | 1 | 198.77 |
| Stop | 11 | ∞ |
| LR | 12 | 44.87 |
| L1 | 1 | 61.31 |
| L2 | 20 | 586.40 |

Single lens data

| Lens | Start surface | Focal length |
|---|---|---|
| 1 | 1 | 47.21 |
| 2 | 2 | −43.00 |
| 3 | 4 | 42.80 |
| 4 | 6 | −50.05 |
| 5 | 8 | −38.82 |
| 6 | 9 | 38.91 |
| 7 | 12 | 42.76 |
| 8 | 13 | −26.19 |
| 9 | 15 | 38.96 |
| 10 | 16 | −46.10 |
| 11 | 18 | 38.77 |
| 12 | 20 | 33.67 |
| 13 | 21 | −40.55 |
| 14 | 23 | −55.64 |
| 15 | 24 | 89.08 |

Numerical Example 3

Unit: mm

Surface data

| Surface number | r | d | nd | vd | D |
|---|---|---|---|---|---|
| 1* | 78.899 | 8.90 | 1.80400 | 46.6 | 41.37 |
| 2 | −67.718 | 1.64 | 1.68893 | 31.1 | 40.70 |
| 3 | 47.472 | 0.20 | | | 38.71 |
| 4 | 40.920 | 7.47 | 2.00100 | 29.1 | 38.96 |
| 5 | 1429.704 | 0.40 | | | 37.86 |
| 6 | 72.656 | 1.40 | 1.61340 | 44.3 | 35.73 |
| 7 | 24.711 | 6.80 | | | 32.09 |
| 8 | −324.647 | 5.80 | 1.91082 | 35.3 | 32.00 |
| 9 | −31.915 | 1.90 | 1.73800 | 32.3 | 31.90 |
| 10 | 298.008 | 3.10 | | | 30.74 |
| 11 (stop) | ∞ | 2.90 | | | |
| 12 | −63.639 | 9.20 | 1.49700 | 81.5 | 29.85 |
| 13 | −19.466 | 1.29 | 1.73800 | 32.3 | 29.88 |
| 14 | −73.147 | 0.44 | | | 31.93 |
| 15 | 307.461 | 7.29 | 1.76385 | 48.5 | 32.50 |
| 16 | −33.624 | 1.28 | 1.66565 | 35.6 | 32.70 |
| 17 | 109.612 | 1.79 | | | 32.81 |
| 18* | 244.351 | 7.96 | 1.88300 | 40.8 | 33.20 |
| 19 | −42.656 | (variable) | | | 35.33 |
| 20 | 52.456 | 8.77 | 1.88300 | 40.8 | 38.06 |
| 21 | −63.325 | 1.54 | 1.59551 | 39.2 | 37.60 |
| 22 | 37.881 | 7.14 | | | 34.56 |

-continued

Unit: mm

| | | | | | |
|---|---|---|---|---|---|
| 23 | −60.219 | 1.21 | 1.67300 | 38.1 | 34.57 |
| 24 | 84.630 | 4.80 | 1.80400 | 46.6 | 36.01 |
| 25* | −271.123 | 14.78 | | | 36.56 |
| Image plane ∞ | | | | | |

Aspherical surface data

First surface

K = 0.00000e+000 A4 = −1.87321e−006 A6 = −2.04579e−009
A8 = 5.76182e−012 A10 = −1.07978e−014 A12 = 8.19265e−018
Eighteenth surface K = 0.00000e+000 A4 = −1.48368e−006 A6 = 1.04147e−008
A8 = −6.04874e−011 A10 = 1.74410e−013 A12 = −1.93793e−016
Twenty-fifth surface K = 0.00000e+000 A4 = 2.13700e−006 A6 = 1.42005e−008
A8 = −5.68578e−011 A10 = 1.36417e−013 A12 = −1.25415e−016

Various kinds of data

| | |
|---|---|
| Focal length | 51.18 |
| F-number | 1.24 |
| Field angle | 22.92 |
| Image height | 21.64 |
| Total lens length | 109.00 |
| BF | 14.78 |

| | Infinity | Close distance |
|---|---|---|
| d19 | 1.00 | 12.61 |

Lens unit data

| Group | Start surface | Focal length |
|---|---|---|
| LF | 1 | 137.35 |
| Stop | 11 | ∞ |
| LR | 12 | 48.25 |
| L1 | 1 | 60.90 |
| L2 | 20 | 841.47 |

Single lens data

| Lens | Start surface | Focal length |
|---|---|---|
| 1 | 1 | 46.59 |
| 2 | 2 | −40.28 |
| 3 | 4 | 41.97 |
| 4 | 6 | −61.73 |
| 5 | 8 | 38.50 |
| 6 | 9 | −38.97 |
| 7 | 12 | 52.78 |
| 8 | 13 | −36.31 |
| 9 | 15 | 40.05 |
| 10 | 16 | −38.52 |
| 11 | 18 | 41.67 |
| 12 | 20 | 33.69 |
| 13 | 21 | −39.58 |
| 14 | 23 | −52.10 |
| 15 | 24 | 80.71 |

Numerical Example 4

Unit: mm

Surface data

| Surface number | r | d | nd | vd | D |
|---|---|---|---|---|---|
| 1* | 82.892 | 12.42 | 1.76802 | 49.2 | 44.32 |
| 2 | −55.277 | 1.00 | 1.73800 | 32.3 | 40.45 |
| 3 | 76.505 | 2.38 | | | 38.99 |
| 4 | 41.265 | 5.51 | 1.95375 | 32.3 | 39.22 |
| 5 | 419.045 | 0.67 | | | 38.73 |
| 6 | 85.376 | 1.00 | 1.65412 | 39.7 | 36.70 |
| 7 | 23.769 | 6.53 | | | 32.73 |
| 8 | −86440.894 | 1.00 | 1.66565 | 35.6 | 32.73 |
| 9 | 30.477 | 9.98 | 2.00100 | 29.1 | 32.53 |
| 10 | 97.639 | 3.47 | | | 31.01 |
| 11 (stop) | ∞ | 3.09 | | | |
| 12 | 810.446 | 9.76 | 1.43875 | 94.7 | 30.20 |
| 13 | −23.577 | 1.67 | 1.72047 | 34.7 | 29.71 |
| 14 | 246.328 | 0.35 | | | 30.96 |
| 15 | 57.202 | 10.09 | 1.76385 | 48.5 | 31.77 |
| 16 | −30.594 | 0.99 | 1.66565 | 35.6 | 31.64 |
| 17 | 56.589 | 1.73 | | | 35.24 |
| 18* | 71.756 | 6.81 | 1.85400 | 40.4 | 37.00 |
| 19* | −47.378 | 0.06 | | | 37.47 |
| 20 | 53.489 | 9.22 | 1.88300 | 40.8 | 39.23 |
| 21 | −44.512 | 1.98 | 1.66565 | 35.6 | 38.99 |
| 22 | 34.871 | 9.28 | | | 34.33 |
| 23 | −40.641 | 1.96 | 1.61340 | 44.3 | 34.36 |
| 24 | −2480.291 | 2.96 | 1.85400 | 40.4 | 36.41 |
| 25* | −154.750 | (variable) | | | 37.15 |
| Image plane ∞ | | | | | |

Aspherical surface data

First surface

K = 0.00000e+000 A4 = −1.25274e−006 A6 = −4.14950e−010
A8 = 9.58468e−014 A10 = 2.22678e−017
Eighteenth surface K = 0.00000e+000 A4 = −2.25923e−006 A6 = 8.73754e−010
A8 = −3.92386e−012 A10 = −8.48899e−018
Nineteenth surface K = 0.00000e+000 A4 = 1.43503e−006 A6 = 8.01071e−010
A8 = −1.43275e−012
Twenty-fifth surface K = 0.00000e+000 A4 = 2.90301e−006 A6 = 2.73324e−010
A8 = 1.09277e−011 A10 = −1.31337e−014 A12 = 5.68359e−018

Various kinds of data

| | |
|---|---|
| Focal length | 51.50 |
| F-number | 1.24 |
| Field angle | 22.79 |
| Image height | 21.64 |
| Total lens length | 113.86 |
| BF | 9.96 |

| | Infinity | Close distance |
|---|---|---|
| d25 | 9.96 | 18.28 |

Lens unit data

| Group | Start surface | Focal length |
|---|---|---|
| LF | 1 | 197.25 |
| Stop | 11 | ∞ |
| LR | 12 | 46.00 |
| L1 | 1 | 51.50 |

Single lens data

| Lens | Start surface | Focal length |
|---|---|---|
| 1 | 1 | 44.93 |
| 2 | 2 | −43.34 |
| 3 | 4 | 47.65 |
| 4 | 6 | −50.68 |
| 5 | 8 | −45.77 |
| 6 | 9 | 41.20 |
| 7 | 12 | 52.41 |

-continued

Unit: mm

| | | |
|---|---|---|
| 8 | 13 | −29.79 |
| 9 | 15 | 27.46 |
| 10 | 16 | −29.70 |
| 11 | 18 | 34.32 |
| 12 | 20 | 28.78 |
| 13 | 21 | −29.08 |
| 14 | 23 | −67.38 |
| 15 | 24 | 193.15 |

Numerical Example 5

Unit: mm

Surface data

| Surface number | r | d | nd | vd | D |
|---|---|---|---|---|---|
| 1* | 140.266 | 6.00 | 1.69680 | 55.5 | 68.65 |
| 2 | 1025.846 | 0.50 | | | 67.92 |
| 3 | 45.000 | 11.63 | 1.49700 | 81.5 | 63.93 |
| 4 | 108.097 | 0.50 | | | 61.71 |
| 5 | 42.000 | 13.18 | 1.49700 | 81.5 | 55.95 |
| 6 | 694.581 | 0.50 | | | 52.55 |
| 7 | 156.475 | 2.50 | 0.00000 | 0.0 | 48.63 |
| 8 | 27.318 | 12.04 | | | 38.70 |
| 9 (stop) | ∞ | 9.06 | | | |
| 10 | −51.011 | 1.60 | 0.00000 | 0.0 | 31.59 |
| 11 | 34.617 | 1.00 | 0.00000 | 0.0 | 30.89 |
| 12 | 42.970 | 7.43 | 1.95375 | 32.3 | 30.88 |
| 13 | −56.583 | 1.33 | | | 30.57 |
| 14 | −40.886 | 1.60 | 1.63980 | 34.5 | 30.22 |
| 15 | 39.077 | 5.35 | 1.43875 | 94.7 | 32.26 |
| 16 | 223.158 | 0.50 | | | 33.68 |
| 17* | 71.431 | 8.00 | 1.80400 | 46.6 | 35.86 |
| 18* | −109.475 | (variable) | | | 36.63 |
| 19 | −210.732 | 7.00 | 1.72916 | 54.7 | 37.53 |
| 20 | −35.130 | 2.00 | 1.58144 | 40.8 | 38.00 |
| 21 | 39.845 | 9.42 | 1.88300 | 40.8 | 40.86 |
| 22 | −163.260 | 2.59 | | | 40.83 |
| 23 | −63.023 | 2.00 | 1.54814 | 45.8 | 40.70 |
| 24 | 2740.602 | (variable) | | | 41.15 |
| Image plane ∞ | | | | | |

Aspherical surface data

First surface

K = 0.00000e+000 A4 = −1.51848e−007 A6 = −4.36090e−011
A8 = 5.04956e−015 A10 = −1.14037e−017
Seventeenth surface K = 0.00000e+000 A4 = 1.30520e−006 A6 = −3.12081e−009
A8 = 1.96852e−011 A10 = −4.44505e−014 A12 = 4.87726e−017
Eighteenth surface K = 0.00000e+000 A4 = 2.19053e−006 A6 = −4.14841e−009
A8 = 2.11600e−011 A10 = −4.65008e−014 A12 = 5.18116e−017

Various kinds of data

| | |
|---|---|
| Focal length | 83.20 |
| F-number | 1.24 |
| Field angle | 14.58 |
| Image height | 21.64 |
| Total lens length | 121.31 |
| BF | 14.08 |

-continued

Unit: mm

| | Infinity | Close distance |
|---|---|---|
| d18 | 1.5 | 16.26 |

Lens unit data

| Group | Start surface | Focal length |
|---|---|---|
| LF | 1 | 118.64 |
| Stop | 9 | ∞ |
| LR | 10 | 74.53 |
| L1 | 1 | 97.68 |
| L2 | 19 | 185.12 |

Single lens data

| Lens | Start surface | Focal length |
|---|---|---|
| 1 | 1 | 232.54 |
| 2 | 3 | 146.17 |
| 3 | 5 | 89.35 |
| 4 | 7 | −50.11 |
| 5 | 10 | −30.75 |
| 6 | 11 | 282.02 |
| 7 | 12 | 26.58 |
| 8 | 14 | −30.99 |
| 9 | 15 | 107.02 |
| 10 | 17 | 54.85 |
| 11 | 19 | 56.86 |
| 12 | 20 | −31.80 |
| 13 | 21 | 37.08 |
| 14 | 23 | −112.36 |

TABLE 1

| | Numerical Example 1 | Numerical Example 2 | Numerical Example 3 | Numerical Example 4 | Numerical Example 5 |
|---|---|---|---|---|---|
| Fno | 1.24 | 1.25 | 1.24 | 1.24 | 1.24 |
| fr | 45.97 | 44.87 | 48.25 | 46.00 | 74.53 |
| ff | 172.21 | 198.77 | 137.35 | 197.25 | 118.64 |
| Δd | 12.22 | 14.16 | 11.61 | 8.32 | 14.76 |
| f | 51.50 | 51.10 | 51.18 | 51.50 | 83.20 |
| BF | 14.00 | 14.60 | 14.78 | 9.96 | 14.08 |
| Dmin | 29.95 | 30.40 | 29.85 | 29.71 | 30.22 |
| Dmax | 41.53 | 41.50 | 41.37 | 44.32 | 68.65 |
| (1) $0.9 \leq Fno \leq 2.8$ | 1.24 | 1.25 | 1.24 | 1.24 | 1.24 |
| (2) $0.1 \leq fr/ff \leq 0.7$ | 0.27 | 0.23 | 0.35 | 0.23 | 0.63 |
| (3) $0.1 \leq |\Delta d/f| \leq 0.5$ | 0.24 | 0.28 | 0.23 | 0.16 | 0.18 |
| (4) $0.1 \leq |BF/f| \leq 0.6$ | 0.27 | 0.29 | 0.29 | 0.19 | 0.17 |
| (5) $0.40 \leq Dmin/Dmax < 1.0$ | 0.72 | 0.73 | 0.72 | 0.67 | 0.44 |

Modified Example

Each of the above-described exemplary embodiments is merely a representative example, and various modifications and changes may be made on each exemplary embodiment in carrying out the present invention.

For example, in each of the aforementioned exemplary embodiments, two magnetic shield members are disposed so as to sandwich a driving coil, but the number of magnetic shield members may be one. A magnetic shield member is only required to be disposed so that a magnetic shield effect can be obtained. In addition, in each of the aforementioned exemplary embodiments, a lens apparatus includes two substrates, the circuit substrate 300 and the communication substrate 212, but a plurality of substrates is not always required and the number of substrates may be one.

In each of the aforementioned exemplary embodiments, an interchangeable lens for a digital camera has been described, but the present invention can be applied also to a lens apparatus included in an optical apparatus, such as a lens integrated imaging apparatus, a digital video camera, or a projector.

Each of the aforementioned numerical examples corresponds to a fixed focal length lens that does not perform zooming, but the configuration of the lens apparatus described in each of the aforementioned exemplary embodiments may be applied to a zoom lens that can perform zooming.

In addition, in each of the aforementioned exemplary embodiments, the first lens holding frame 201 and the second lens holding frame 202 are fixed to each other by a screw. In addition, the second lens holding frame 202 is held by the cam follower 222 so as to be position-adjustable with respect to the third lens holding frame 203 in a manufacturing process. After the position adjustment in the manufacturing process is completed, the position of the second lens holding frame 202 with respect to the third lens holding frame 203 becomes unchangeable by the second lens holding frame 202 being bonded with UV adhesive agent or the like.

Nevertheless, the present invention is not limited to such a configuration. For example, instead of fixing the first lens holding frame and the second lens holding frame, the first lens holding frame and the third lens holding frame may be fixed to each other by a screw. If the first lens holding frame and the third lens holding frame are fixed to each other by a screw, the second lens holding frame is held by the cam follower so as to be position-adjustable with respect to the first lens holding frame in a manufacturing process. After the position adjustment in the manufacturing process is completed, the position of the second lens holding frame with respect to the first lens holding frame becomes unchangeable by the second lens holding frame being bonded with UV adhesive agent or the like.

In addition, in each of the aforementioned exemplary embodiments, focusing is performed in such a manner that the first to third lens holding frames 201, 202, and 203 move forward or backward in the optical axis OA direction. The lens holding frame other than the first to third lens holding frames 201, 202, and 203 does not move forward or backward in the optical axis OA direction in focusing. Nevertheless, the present invention is not limited to such a configuration. For example, focusing may be performed in such a manner that all the lens holding frames move forward or backward in the optical axis OA direction in focusing.

Here, the driving coils 301b, 302b, 303b, and 304b in each of the aforementioned exemplary embodiments will be described again. Among coils 301b, 302b, 303b, and 304b, the coils 301b and 302b may be used as driving coils, the coil 303b may be used as a power coil, and the coil 304b may be used as a filter coil. The circuit substrate 300 includes a control IC. Electric power output from the communication substrate 212 is amplified through the power coil 303b and the filter coil 304b, and supplied to the control IC included in the circuit substrate 300. The control IC included in the circuit substrate 300 supplies a pulse signal to the driving coils 301b and 302b upon receiving a drive command signal transmitted from the communication substrate 212.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-165389, filed Sep. 4, 2018, which is hereby incorporated by reference herein in its entirety.

What is claimed is:

1. A lens apparatus comprising:
an imaging optical system including a plurality of lenses;
a first holding member holding at least a first lens closest to an object among the plurality of lenses, and configured to move in an optical axis direction of the imaging optical system to perform focusing;
a barrel member provided on an outside of the first holding member; and
a control unit configured to control a driving unit configured to move the first holding member,
wherein, when focus is at infinity, an edge surface on an object side of the barrel member is positioned on the object side of a surface vertex of an object-side surface of the first lens, and
wherein, when focus is at infinity, an edge surface on the object side of the control unit is positioned on the object side of the surface vertex.

2. The lens apparatus according to claim 1, wherein, when focus is at a close distance, the edge surface of the control unit is positioned on an image side of the surface vertex.

3. The lens apparatus according to claim 1,
wherein the control unit includes a coil configured to drive the driving unit, and
wherein the coil includes an electric cable winded about an axis orthogonal to the optical axis direction.

4. The lens apparatus according to claim 3, further comprising a first shield member covering at least part of the coil in at least one of a directional vision parallel to the optical axis direction and a directional vision orthogonal to the optical axis direction.

5. The lens apparatus according to claim 4, further comprising a second shield member provided on an opposite side of a side on which the first shield member is provided, with respect to the coil,
wherein the first shield member covers at least part of the coil in the directional vision orthogonal to the optical axis direction.

6. The lens apparatus according to claim 1, wherein the control unit includes a plurality of mounting portions that is disposed in a circumferential direction extending around the optical axis direction, and each includes the coil, and a flexible cable portion each connecting between the plurality of mounting portions.

7. The lens apparatus according to claim 1, wherein the following conditional expression is satisfied:

$$0.9 \le Fno \le 2.8,$$

where an F-number in an infinity focusing state of the imaging optical system is denoted by Fno.

8. The lens apparatus according to claim 1, wherein the imaging optical system consists of, in order from the object side to an image side, a front lens subunit having positive refractive power, an aperture stop, and a rear lens subunit, and the following conditional expression is satisfied:

$$0.1 \le fr/ff \le 0.7,$$

where a focal length of the front lens subunit is denoted by ff and a focal length of the rear lens subunit is denoted by fr.

9. The lens apparatus according to claim 1, wherein the following conditional expression is satisfied:

$$0.1 \leq |\Delta d/f| \leq 0.5,$$

where a focal length in an infinity focusing state of the imaging optical system is denoted by f, and a movement amount of a lens unit, among the plurality of lenses, configured to move in focusing from the infinity focusing state to a close-distance focusing state is denoted by $\Delta d$.

10. The lens apparatus according to claim 1, wherein the following conditional expression is satisfied:

$$0.1 \leq |BF/f| \leq 0.6,$$

where back focus in an infinity focusing state of the imaging optical system is denoted by BF.

11. The lens apparatus according to claim 1, wherein the following conditional expression is satisfied:

$$0.40 \leq D\text{min}/D\text{max} < 1.0,$$

where, among the plurality of lenses, a diameter of a lens having a largest diameter is denoted by Dmax, and a diameter of a lens having a smallest diameter is denoted by Dmin.

12. The lens apparatus according to claim 1, wherein the lens apparatus is detachably mountable to an imaging apparatus including an image sensor.

13. An imaging system comprising:
a lens apparatus according to claim 1; and
an image sensor configured to receive light from the lens apparatus.

* * * * *